(12) United States Patent
Lucas

(10) Patent No.: US 11,928,175 B1
(45) Date of Patent: Mar. 12, 2024

(54) PROCESS FOR QUANTIFYING USER INTENT FOR PRIORITIZING WHICH KEYWORDS TO USE TO RANK A WEB PAGE FOR SEARCH ENGINE QUERIES

(71) Applicant: Linze Kay Lucas, Walnut Creek, CA (US)

(72) Inventor: Linze Kay Lucas, Walnut Creek, CA (US)

( * ) Notice: Subject to any disclaimer, the term of this patent is extended or adjusted under 35 U.S.C. 154(b) by 7 days.

(21) Appl. No.: 17/860,053

(22) Filed: Jul. 7, 2022

Related U.S. Application Data

(60) Provisional application No. 63/219,084, filed on Jul. 7, 2021.

(51) Int. Cl.
*G06F 16/958* (2019.01)
*G06F 16/9532* (2019.01)

(52) U.S. Cl.
CPC ........ *G06F 16/986* (2019.01); *G06F 16/9532* (2019.01)

(58) Field of Classification Search
CPC ............................ G06F 16/986; G06F 16/9532
See application file for complete search history.

(56) References Cited

U.S. PATENT DOCUMENTS

| | | | |
|---|---|---|---|
| 9,594,851 B1* | 3/2017 | Chechik | G06F 16/90324 |
| 9,798,820 B1* | 10/2017 | Prémont-Schwarz | G06F 16/3347 |
| 10,380,650 B2* | 8/2019 | Hamedi | G06Q 30/0204 |
| 11,222,027 B2* | 1/2022 | Huh | G06F 16/953 |
| 11,704,714 B2* | 7/2023 | Hiranandani | G06N 3/08 705/26.62 |
| 2009/0193007 A1* | 7/2009 | Mastalli | G06F 16/3326 707/999.005 |
| 2009/0265338 A1* | 10/2009 | Kraft | G06F 16/951 707/999.005 |
| 2010/0094835 A1* | 4/2010 | Lu | G06F 16/951 707/E17.143 |
| 2010/0169338 A1* | 7/2010 | Kenedy | G06F 16/9535 707/E17.014 |
| 2013/0311271 A1* | 11/2013 | Agrawal | G06Q 30/02 705/14.71 |
| 2014/0075004 A1* | 3/2014 | Van Dusen | G06N 5/04 709/223 |
| 2016/0055490 A1* | 2/2016 | Keren | G06Q 30/00 705/14.47 |
| 2016/0078131 A1* | 3/2016 | Venugopal | G06F 16/334 707/706 |
| 2017/0091814 A1* | 3/2017 | Liu | G06Q 30/0269 |
| 2017/0255652 A1* | 9/2017 | Kong | G06F 16/5866 |
| 2017/0262899 A1* | 9/2017 | Geraghty | G06Q 30/0277 |
| 2018/0107744 A1* | 4/2018 | Klouche | H04L 69/16 |
| 2018/0121430 A1* | 5/2018 | Kagoshima | G06F 16/951 |
| 2020/0334307 A1* | 10/2020 | Prasad | G06F 16/9535 |
| 2021/0110208 A1* | 4/2021 | Ahmadvand | G06F 16/9535 |

(Continued)

*Primary Examiner* — Mark E Hershley
(74) *Attorney, Agent, or Firm* — Plager Schack LLP; Mark H. Plager; Stephen Hallberg

(57) ABSTRACT

Processes for quantifying user intent for prioritizing which keywords to use to rank a web page for search engine queries are disclosed. By assessing the intent of a keyword through the observation of returned search results and search result page features, one can determine how a search engine understands that keyword. This allows for adjustment of keyword selection and content curation to satisfy the intent the search engine is looking for.

9 Claims, 22 Drawing Sheets

(56) References Cited

U.S. PATENT DOCUMENTS

| | | | | |
|---|---|---|---|---|
| 2021/0248624 A1* | 8/2021 | Keren | .................. | G06Q 50/184 |
| 2021/0342915 A1* | 11/2021 | Shivaswamy | ..... | G06F 16/24578 |
| 2022/0004589 A1* | 1/2022 | Park | ...................... | G06F 40/279 |

* cited by examiner

US 11,928,175 B1

PROCESS FOR QUANTIFYING USER INTENT FOR PRIORITIZING WHICH KEYWORDS TO USE TO RANK A WEB PAGE FOR SEARCH ENGINE QUERIES

CLAIM OF BENEFIT TO PRIOR APPLICATION

This application claims benefit to U.S. Provisional Patent Application 63/219,084, entitled "PROCESS FOR QUANTIFYING USER INTENT FOR PRIORITIZING WHICH KEYWORDS TO USE TO RANK A WEB PAGE FOR SEARCH ENGINE QUERIES," filed Jul. 7, 2021. The U.S. Provisional Patent Application 63/219,084 is incorporated herein by reference.

BACKGROUND

Embodiments of the invention described in this specification relate generally to search engine optimization, and more particularly, to a process for quantifying user intent for prioritizing which keywords to use to rank a web page for search engine queries.

Search engine optimization relies on the use of specific terms (keywords). Search engines, as well as search engine optimization (SEO) tools such as SEMrush, Ahrefs, and others, track how many people search for keywords every month (and/or monthly average), how difficult it is to rank within a search for a keyword, how much it would cost to pay to appear on page in an advertisement slot for a keyword, how much traffic a keyword can bring to a webpage, and more. All of this data (keyword metrics) is collected per keyword. Each keyword metric can be used in numerous combinations of prioritization to determine how to optimize (place keywords on a webpage) webpage content. There is no standard recommendation for keyword research, and nearly every SEO performs the practice in a different way. Some select keywords by the volume of monthly searches. Others by how difficult a keyword is to compete for. Others choose based on how much traffic a keyword can bring. An endless combination of metric permutation exists.

A keyword can have a high search volume, but if it is off intent it will not rank well. A keyword can have a low search difficulty, and again, if it is off intent it will not rank well. A keyword can also be extremely relevant to an industry, but if a search engine does not understand the keyword in the context of that industry, it likely will not rank.

Therefore, what is needed a way to prioritize keyword usage according to user intent or otherwise use keyword intent as one of multiple metrics to consider.

BRIEF DESCRIPTION

Novel processes for quantifying user intent for prioritizing which keywords to use to rank a web page for search engine queries are disclosed. In some embodiments, the processes assess intent of a keyword by evaluation of search results and search result page features. This allows one to determine how a search engine understands that keyword. Then is it possible to adjust keyword selection or content curation to satisfy the intent. In some embodiments, intent is one of several metrics involved in keyword data prioritization.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
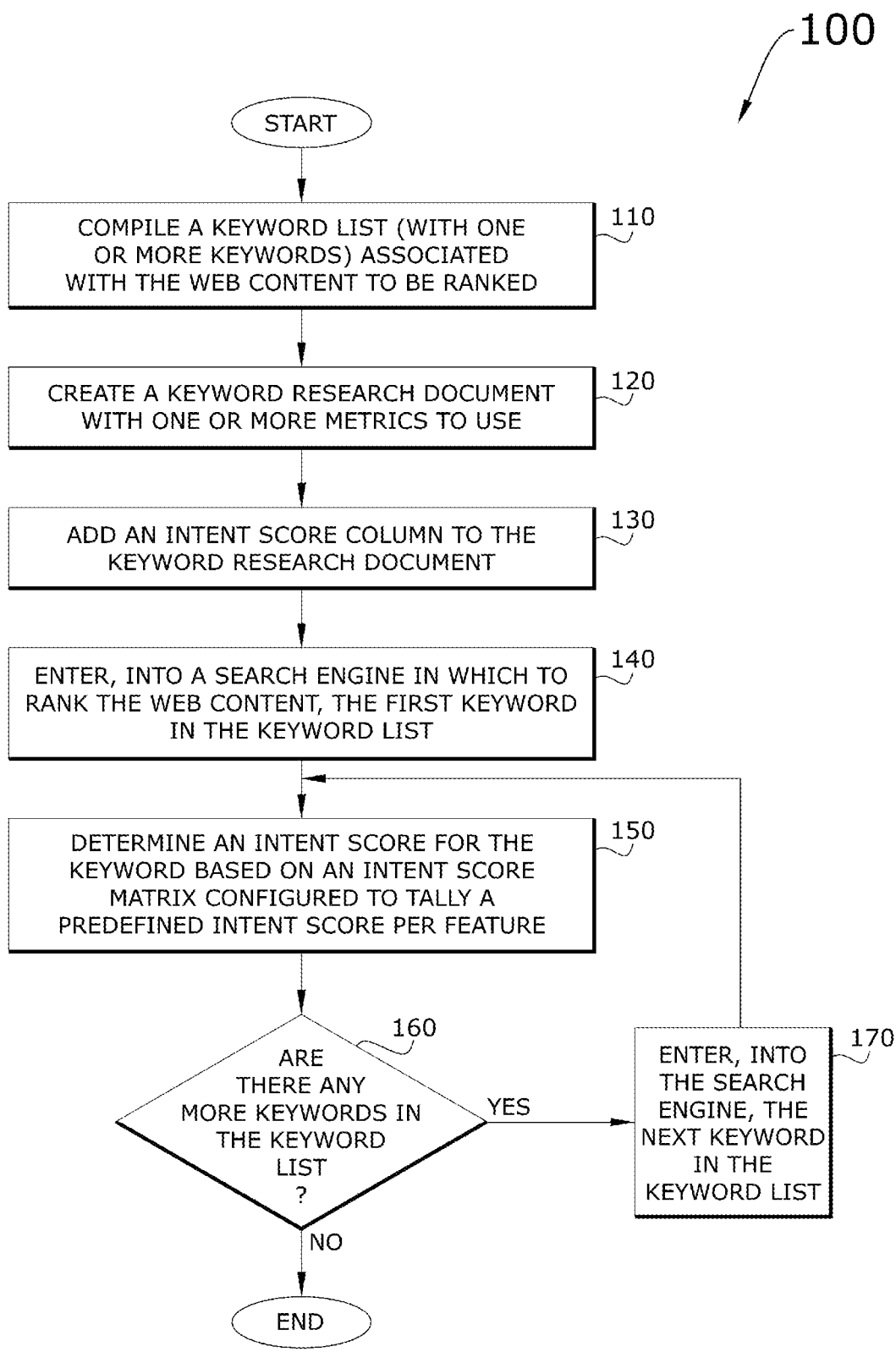
FIG. 1 conceptually illustrates a high-level user intent score quantification process in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments provide processes for quantifying user intent for prioritizing which keywords to use to rank a web page for search engine queries. In some embodiments, the processes assess intent of a keyword by evaluation of search results and search result page features. This allows one to determine how a search engine understands that keyword. Then is it possible to adjust keyword selection or content curation to satisfy the intent. In some embodiments, intent is one of several metrics involved in keyword data prioritization.

Embodiments of the processes for quantifying user intent for prioritizing which keywords to use to rank a web page for search engine queries solve such problems by determining an "intent score" for keywords considered for the web page based on comparing the search engine results page content to the web content to rank. The closer the match, the better the intent score for each of several webpage features.

Embodiments of the processes for quantifying user intent for prioritizing which keywords to use to rank a web page for search engine queries differ from and improve upon currently existing options. In particular, existing options for keyword research typically involve the use of many metrics. Most people use the standard metrics as offered by tools like Ahrefs, SEMrush and Google Keyword Planner to select, and prioritize their keywords. These tools do not quantify intent in ways that shed light on a search engine's understanding of the intent. Thus, keyword research tools and SEOs alike do not have a standard measure for a search engine's understanding of a query and how that understanding will affect the performance of the queries (keywords) placed into the content. Yet, many industries leaders acknowledge intent is a highly important ranking factor.

At least one embodiment of the process for quantifying user intent for prioritizing which keywords to use to rank a web page for search engine queries of the present disclosure may be comprised of the following steps and elements.

1. Determine the intent of a piece of content to rank.
2. Compile a keyword list that logically seems to match the intent of the content to rank (alternately, using any standard keyword research process).
3. Use a keyword research tool to extract metrics to enter in keyword list.
4. Add metrics to a spreadsheet—each metric may have a column, e.g., Keyword, Search Volume, Difficulty, etc.
5. Create a new column after the Keyword column.
6. Label the new column, "Intent Score".
7. Enter the first keyword in the list into the search engine to be ranked in.
8. Examine the results page returned.
9. Use intent score matrix to tally the predefined intent score per feature.
10. Return to the list of keywords and repeat this process, documenting the intent score based on the matrix.
11. Once intent score is assigned to each keyword, sort the list by intent score.
12. Prioritize keyword usage based on proximity to an intent score of one.
13. Add prioritized keywords to an SEO strategy, campaign, web page, etc.

The processes for quantifying user intent for prioritizing which keywords to use to rank a web page for search engine queries work by software implementation. For example, a search tool that is implemented as a plug-in module of a browser and which triggers one or more of the processes for quantifying user intent for prioritizing which keywords to use to rank a web page for search engine queries when run in a search engine, thereby providing a more user-friendly manner of quantifying intent for search engine ranking.

To make the process for quantifying user intent for prioritizing which keywords to use to rank a web page for search engine queries of the present disclosure, a person can implement these functional aspects in spreadsheets, word documents, computer programs, etc., or anywhere that a person can prioritize information. A standard matrix is typical for many deployments of the process for quantifying user intent for prioritizing which keywords to use to rank a web page for search engine queries. In this way, anyone can generate intent scores for keywords. In some other deployments, the process for quantifying user intent for prioritizing which keywords to use to rank a web page for search engine queries is implemented as part of a match system that generates an intent score based on a matrix, which allows the automated process to assess the matching of content between a prospective webpage, and the present search engine results. Just generally providing a standardized matrix is a workable approach to evaluate how on target the intent of a keyword is in regards to the page to be ranked.

Additionally, it is possible to reverse the steps of the process by examining the position a webpage is in for a particular keyword, then running a reverse intent test to see if the understanding of that keyword matches with the webpage it is sitting on, and use that information to make changes to a keyword strategy, or to determine why a website's rankings suddenly change. Also, the process for quantifying user intent for prioritizing which keywords to use to rank a web page for search engine queries can be adapted for keyword intent data.

By way of example, FIG. 1 conceptually illustrates a high-level user intent score quantification process 100. As shown in this figure, the high-level user intent score quantification process 100 starts by compiling a keyword list (at 110) associated with web content to be ranked. The keyword list may include any positive number of keywords (i.e., one or more keywords compiled for the keyword list). Next, the high-level user intent score quantification process 100 includes a step for creating a keyword research document with one or more metrics (at 120). The keyword research document may be created automatically by a program with pre-programmed instructions for the metrics to use. However, the keyword research document may be just as easily created by a human user, or not even created, but just accessed as a previously created research document with various metrics to focus on this case. There are many alternatives that would be possible in terms of format and type of document created. For purposes of simplicity, a document with a table format can be considered or a spreadsheet document with rows and columns.

In some embodiments, the high-level user intent score quantification process 100 proceeds to a next step of adding an intent score column to the keyword research document (at 130). The intent score column is intended for recording intent score. Instead of being a column, it may be a row or other formatted area according to the type or format of the keyword research document. Next, the high-level user intent score quantification process 100 proceeds to the next step of entering the first keyword in the keyword list into a search engine (at 140). The search engine outputs a page of results based on the keyword—referred to as the search engine results page (or "SERP").

After entering the first keyword into the search engine, the high-level user intent score quantification process 100 determines the intent score for the keyword (at 150). In some embodiments, the high-level user intent score quantification process 100 determines the intent score for the keyword based on an intent score matrix (at 150). In some embodiments, the intent score matrix is configured to tally a predefined intent score for each feature among several features comprising features that consistently appear in web pages or web content, features that may possibly appear in web pages or web content, unique or new features that arise through innovation and development, and other features. For example, a shopping carousel (or 'popular products') is a feature that consistently appears in e-commerce websites. While it is possible and valid to check the features of any given webpage, the shopping carousel feature mentioned in this application refers to a shopping feature that is presented in the SERP. The intent score matrix may be predefined in many different ways, according to the needs and requirements of a user or entity. Several examples of predefined intent scores applied to several different features processed via an intent score matrix are described below, by reference to FIGS. 4-11, and several more examples of predefined intent scores applied to several different positions of content in a search engine's SERP output and processed according to an intent score matrix are described further below, by reference to FIGS. 12-22.

After determining the intent score for the keyword based on the intent score matrix, the high-level user intent score quantification process 100 determines (at 160) whether there are any more keywords to consider in the keyword list. When there are more keywords in the keyword list, the high-level user intent score quantification process 100 then proceeds to a step for entering the next keyword in the keyword list into the search engine (at 170). Then the high-level user intent score quantification process 100 transitions back to the step for determining the intent score for the next keyword based on the intent score matrix (at 150) and proceeds in the manner described above. When no more keywords are determined (at 160) to remain, then the high-level user intent score quantification process 100 ends.

Figure 2:
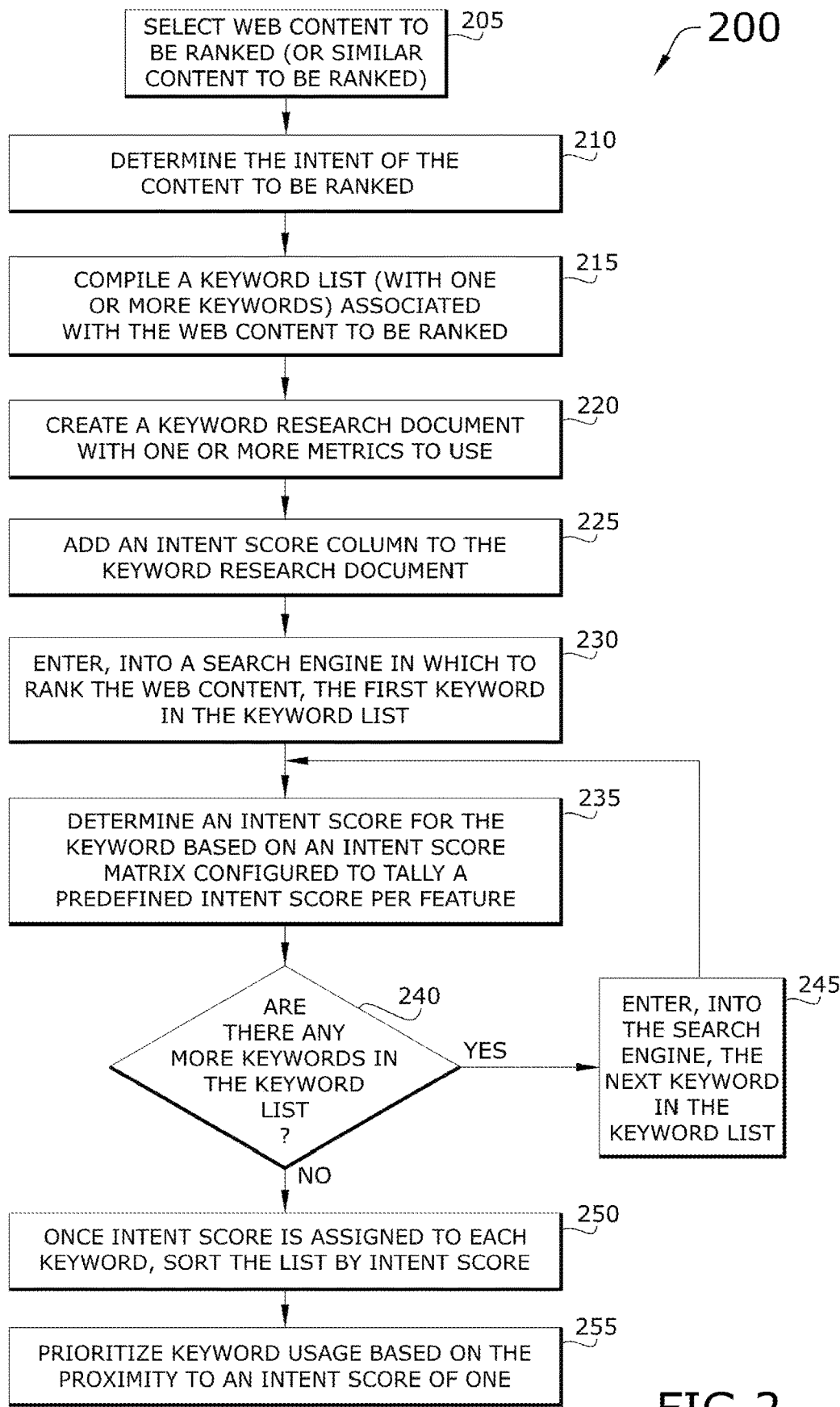
FIG. 2 conceptually illustrates a detailed user intent score quantification process for prioritizing keyword usage in ranking content for search engine queries in some embodiments.

By way of example, FIG. 2 conceptually illustrates a detailed user intent score quantification process for prioritizing keyword usage in ranking content for search engine queries 200. As shown in this figure, the detailed user intent score quantification process for prioritizing keyword usage in ranking content for search engine queries 200 starts with a selection (at 205) of web content. The web content is either the web content to be ranked or web content that is similar to expected web content the user wishes to rank.

In some embodiments, the detailed user intent score quantification process for prioritizing keyword usage in ranking content for search engine queries 200 determines the intent of the content to be ranked (at 210). For example, an e-commerce website that intends to sell shoes may find a keyword like 'footwear' highly relevant to the intent of the content to be ranked, but find another keyword like 'e-commerce' to be less relevant to the specific intent of selling shoes. Also, keywords will have different meaning for different search engines. Therefore, the detailed user intent score quantification process 200 starts with determining that intent of the content to be ranked.

After determining the intent of the content to be ranked, the detailed user intent score quantification process 200 moves forward to a step for compiling a keyword list of one or more keywords associated with the web content to be ranked (at 215). In some embodiments, a keyword research document is created (at 220) with one or more metrics to use in evaluating the keywords. Again, the keyword research documents may have any kind of format or be of any type of organized file, and it may be created new or loaded from a previous creation, cleaned (e.g., deleting old data and results and starting afresh), and applied with new metrics and new keyword list for different web content to be ranked. Also, the detailed user intent score quantification process 200 of some embodiments adds an intent score column (or row, or other organized field or area) to the keyword research document (at 225).

Figure 3:
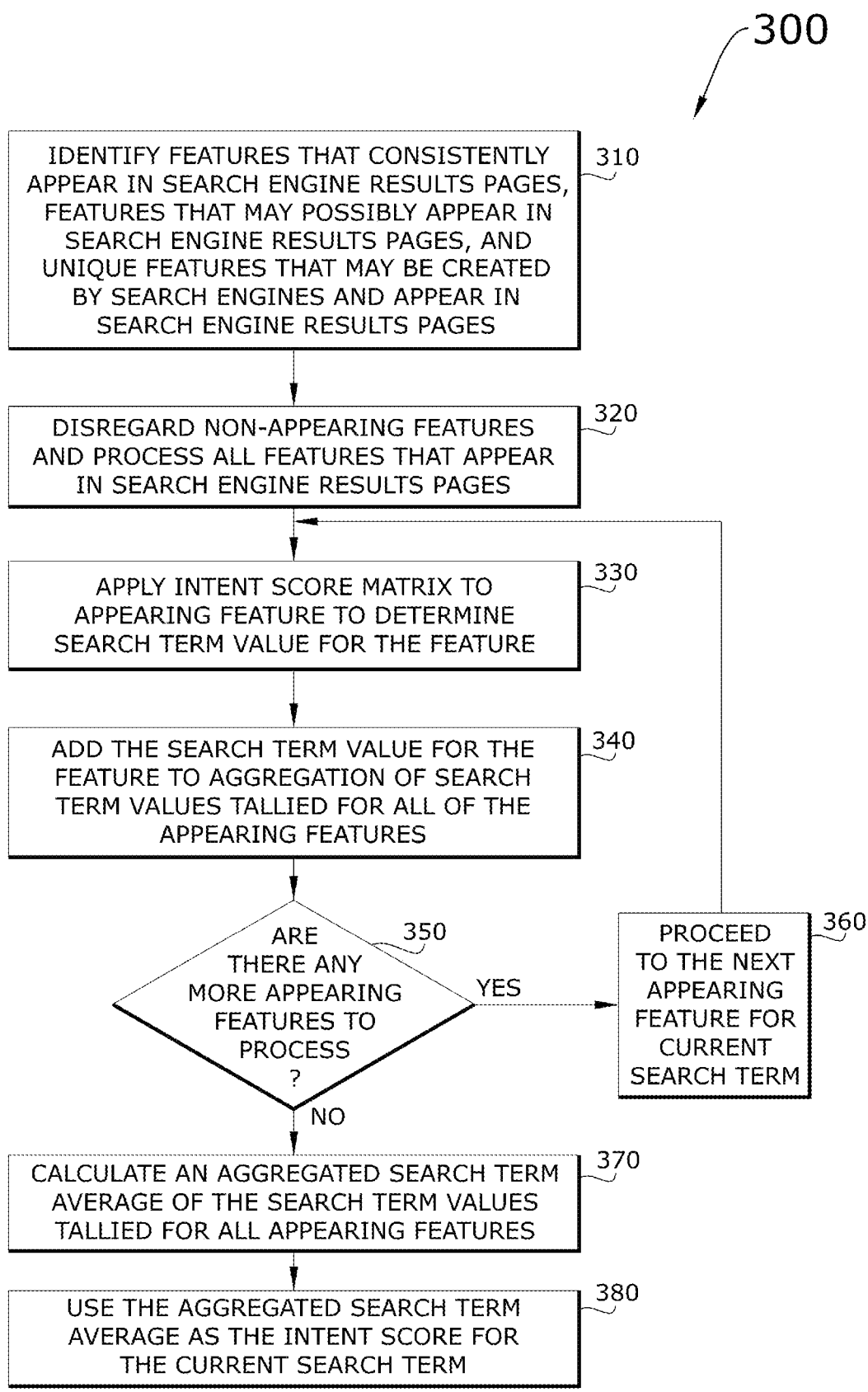
FIG. 3 conceptually illustrates a process for using an intent score matrix to determine an intent score for a keyword on a feature-by-feature basis in some embodiments.

In some embodiments, the detailed user intent score quantification process 200 moves on to the next step of entering, into the search engine, the first keyword from the keyword list (at 230). The detailed user intent score quantification process 200 then processes the output of the SERP to determine an intent score for the keyword (at 235) based on the intent score matrix, which is configured to tally a predefined intent score on a feature-by-feature basis. An example of a process for using an intent score matrix to determine an intent score for a keyword on a feature-by-feature basis is described below, by reference to FIG. 3.

After determining the intent score for the keyword, the detailed user intent score quantification process 200 of some embodiments determines (at 240) whether there are any keywords remaining in the keyword list to evaluate intent score. When there are more keywords in the keyword list to evaluate, the detailed user intent score quantification process 200 retrieves the next keyword in the keyword list and enters the next keyword into the search engine (at 245). Then the detailed user intent score quantification process 200 transitions back to the step for determining the intent score of the keyword (at 235), as described above.

On the other hand, when an intent score is assigned to each keyword in the keyword list and there are no more keywords remaining in the keyword list to evaluate, then the detailed user intent score quantification process 200 sorts the keywords in the keyword list according to their assigned intent scores (at 250). Next, the detailed user intent score quantification process 200 prioritizes keyword usage (at 255) based on their proximity to an intent score of one ('1'). Then the detailed user intent score quantification process 200 ends.

As noted above, the detailed user intent score quantification process 200 determines an intent score for a keyword based on the intent score matrix on a feature-by-feature basis (at 235). This is described next, by reference to FIG. 3, which conceptually illustrates a process for using an intent score matrix to determine an intent score for a keyword on a feature-by-feature basis 300. As shown in this figure, the process for using an intent score matrix to determine an intent score for a keyword on a feature-by-feature basis 300 involves identifying features in search engine results pages (at 310). In particular, the process for using an intent score matrix to determine an intent score for a keyword on a feature-by-feature basis 300 involves identification of features that consistently appear and features which may possibly appear in SERPs, as well as identifying any newly created unique features that may appear in SERPs.

In some embodiments, the process for using an intent score matrix to determine an intent score for a keyword on a feature-by-feature basis 300 processes (or evaluates) all features that appear in web pages of the SERP and disregards non-appearing features (at 320). With one or more appearing features ready to evaluate, the process for using an intent score matrix to determine an intent score for a keyword on a feature-by-feature basis 300 applies an intent score matrix to an appearing feature to determine a search term value for the feature (at 330). Application of an intent score matrix to several different exemplary features are described in detail below, by reference to FIGS. 4-22.

Next, the process for using an intent score matrix to determine an intent score for a keyword on a feature-by-feature basis 300 adds the search term value for the appearing feature to an aggregation of search term values tallied for all of the appearing features (at 340). Then the process for using an intent score matrix to determine an intent score for a keyword on a feature-by-feature basis 300 determines (at 350) whether there are any more appearing features to evaluate (or process). When there are more appearing features, the process for using an intent score matrix to determine an intent score for a keyword on a feature-by-feature basis 300 proceeds to the next appearing feature for the current search term (at 360) and transitions back to the step for applying the intent score matrix to the next appearing feature to determine a search term value for the next appearing feature (at 330), as described above.

On the other hand, when there are no more appearing features to evaluate, the process for using an intent score matrix to determine an intent score for a keyword on a feature-by-feature basis 300 of some embodiments proceeds to a step for calculating an aggregated search term average (at 370) of the search term values tallied for all appearing features. In some embodiments, the process for using an intent score matrix to determine an intent score for a keyword on a feature-by-feature basis 300 continues forward to a final step of using the aggregated search term average as the overall intent score for the current search term (at 380) Then the process for using an intent score matrix to determine an intent score for a keyword on a feature-by-feature basis 300 ends. Note that this process for using an intent score matrix to determine an intent score for a keyword on a feature-by-feature basis 300 is typically repeated since it would be performed for each keyword in the keyword list.

Figure 4:
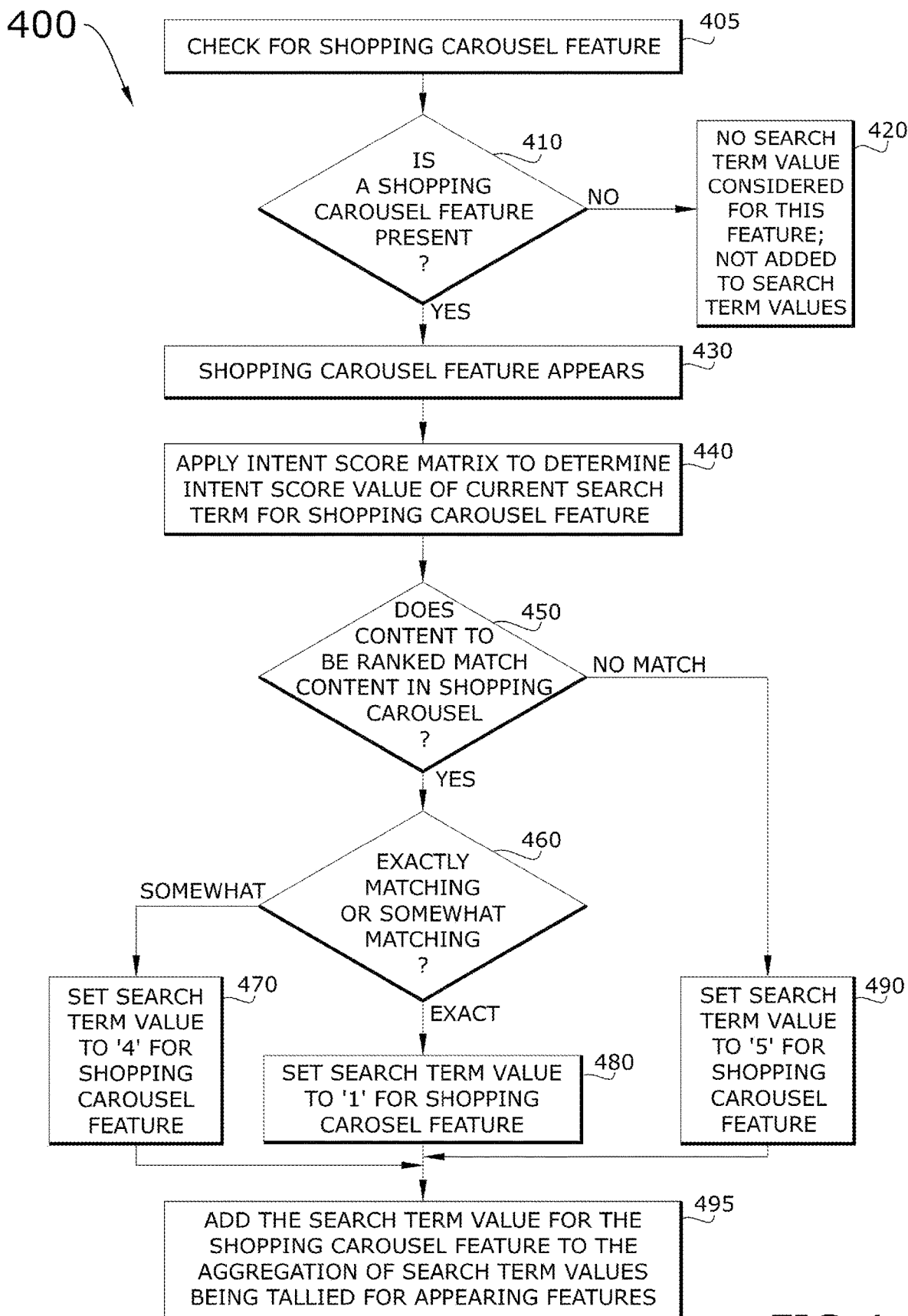
FIG. 4 conceptually illustrates an intent score matrix shopping carousel feature application process for determining a search term value for a shopping carousel feature appearing in content to be ranked in some embodiments.

By way of a first feature example, FIG. 4 conceptually illustrates an intent score matrix shopping carousel feature application process for determining a search term value for a shopping carousel feature appearing in content to be ranked 400 (hereinafter referred to as the "intent score matrix shopping carousel feature application process 400"). As shown in this figure, the intent score matrix shopping carousel feature application process 400 starts by checking for a shopping carousel feature (at 405). The intent score matrix shopping carousel feature application process 400 checks by determining (at 410) whether a shopping carousel feature is present or not. As noted above, the shopping carousel feature is determined by identification of a shopping feature presented in the SERP. When a shopping carousel feature is determined (at 410) not to be present, no search term value is considered for the shopping carousel feature and the intent score matrix shopping carousel feature application process 400 does not add any value to the search term values (at 420). However, if shopping carousel feature is affirmatively determined (at 410) to be present, then the shopping carousel feature appears (at 430) as present.

In some embodiments, the intent score matrix shopping carousel feature application process 400 applies the intent score matrix to determine an intent score value of the current search term for the shopping carousel feature (at 440). In some embodiments, the intent score matrix shopping carousel feature application process 400 applies the intent score matrix by determining (at 450) whether the content to be ranked matches content in the shopping carousel. When the content to be ranked partially or fully matches the content in the shopping carousel, the intent score matrix shopping carousel feature application process 400 proceeds forward to determine the search term value, which is described further below. On the other hand, when the content to be ranked does not match the content in the shopping carousel, the intent score matrix shopping carousel feature application process 400 sets the search term value to five ('5') for the shopping carousel feature (at 490) and adds the search term value (of five) for the shopping carousel feature to the aggregation of search term values being tallied (at 495).

Turning back to the determination (at 450), when the content to be ranked matches the content in the shopping carousel, the intent score matrix shopping carousel feature application process 400 determines (at 460) whether the content to be ranked exactly matches the content in the shopping carousel or only somewhat (partially) matches the content in the shopping carousel. When the content to be ranked only somewhat matches the content in the shopping carousel, the intent score matrix shopping carousel feature application process 400 of some embodiments sets the search term value to four ('4') for the shopping carousel feature (at 470) and proceeds to add the search term value (of four) for the shopping carousel feature to the aggregation of search term values being tallied for the appearing features (at 495). On the other hand, when the content to be ranked exactly matches the content in the shopping carousel, the intent score matrix shopping carousel feature application process 400 sets the search term value to one ('1') for the shopping carousel feature (at 480). Then the intent score matrix shopping carousel feature application process 400 adds (at 495) the search term value (of one) for the shopping carousel feature to the aggregation of search term values being tallied for the appearing features. After adding the search term (either '1', '4', or '5' depending on matching status) for the shopping carousel feature to the aggregation of search term values being tallied, the intent score matrix shopping carousel feature application process 400 ends.

Figure 5:
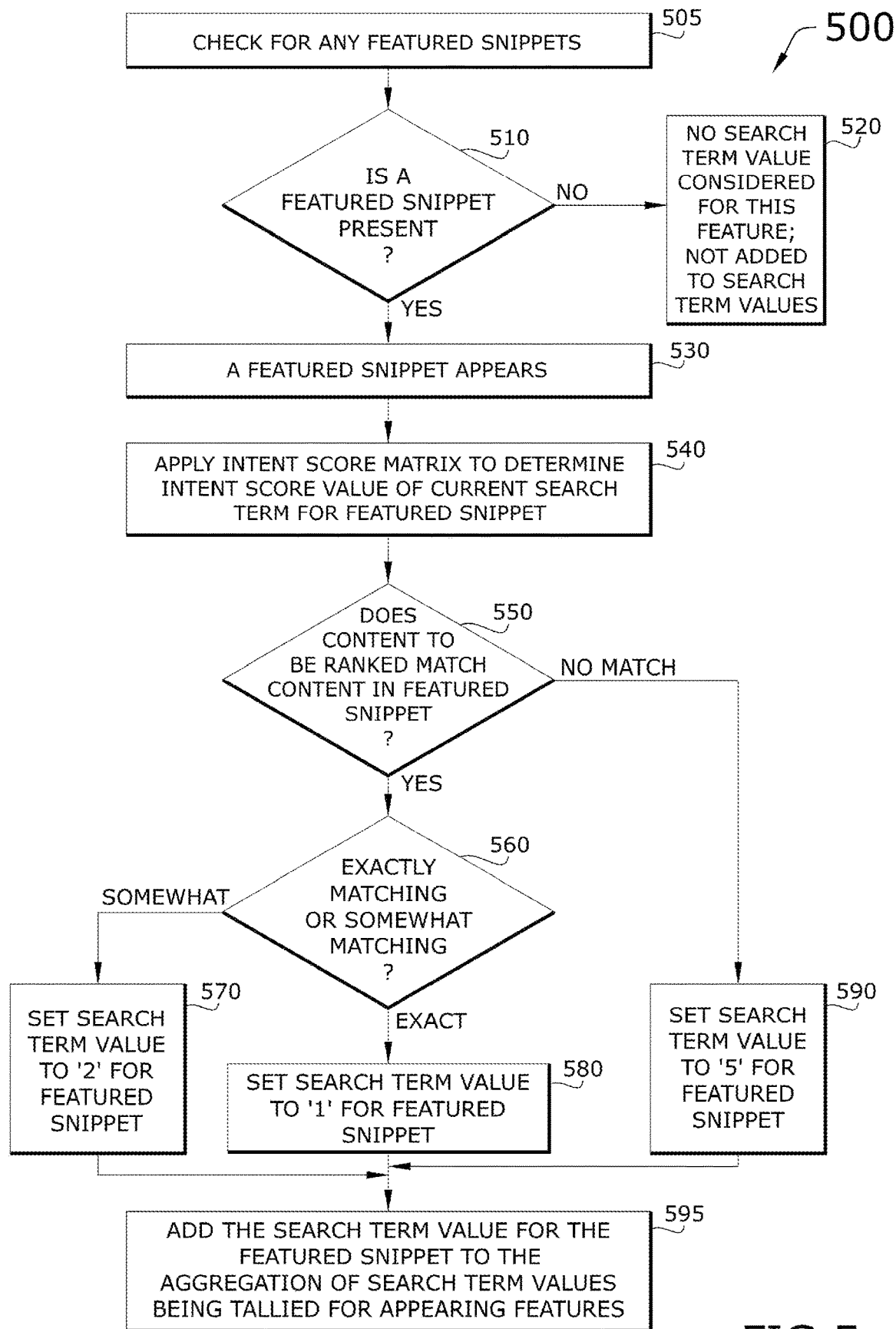
FIG. 5 conceptually illustrates an intent score matrix featured snippet application process for determining a search term value for a featured snippet appearing in content to be ranked in some embodiments.

By way of a second feature example, FIG. 5 conceptually illustrates an intent score matrix featured snippet application process for determining a search term value for a featured snippet appearing in content to be ranked 500 (hereinafter referred to as the "intent score matrix featured snippet application process 500"). As shown in this figure, the intent score matrix featured snippet application process 500 starts by checking for any featured snippets on the SERP (at 505). The intent score matrix featured snippet application process 500 checks by determining (at 510) whether a featured snippet is present or not. When a feature snippet is determined (at 510) not to be present, no search term value is considered for the featured snippet and the intent score matrix featured snippet application process 500 does not add any value to the search term values (at 520). However, if a featured snippet is affirmatively determined (at 510) to be present, then the featured snippet appears (at 530).

In some embodiments, the intent score matrix featured snippet application process 500 applies the intent score matrix to determine an intent score value of the current search term for the featured snippet (at 540). In some embodiments, the intent score matrix featured snippet application process 500 applies the intent score matrix by determining (at 550) whether the content to be ranked matches content in the featured snippet. When the content to be ranked partially or fully matches the content in the featured snippet, the intent score matrix featured snippet application process 500 proceeds forward to determine the search term value, which is described further below. On the other hand, when the content to be ranked does not match the content in the featured snippet, the intent score matrix featured snippet application process 500 sets the search term value to five ('5') for the featured snippet (at 590) and adds the search term value (of five) for the featured snippet to the aggregation of search term values being tallied for the appearing features (at 595).

Turning back to the determination (at 550), when the content to be ranked matches the content in the featured snippet, the intent score matrix featured snippet application process 500 determines (at 560) whether the content to be ranked exactly matches the content in the featured snippet or only somewhat (partially) matches the content in the featured snippet. When the content to be ranked only somewhat (partially) matches the content in the featured snippet, the intent score matrix featured snippet application process 500 sets the search term value to two ('2') for the featured snippet (at 570) and proceeds to add the search term value (of two) for the featured snippet to the aggregation of search term values being tallied for the appearing features (at 595). On the other hand, when the content to be ranked exactly matches the content in the featured snippet, the intent score matrix featured snippet application process 500 sets the search term value to one ('1') for the featured snippet (at 580) and adds (at 595) the search term value (of one) for the featured snippet to the aggregation of search term values being tallied for the appearing features. After adding the search term (either '1', '2', or '5' depending on matching status) for the featured snippet to the aggregation of search term values being tallied for the appearing features, the intent score matrix featured snippet application process 500 ends.

Figure 6:
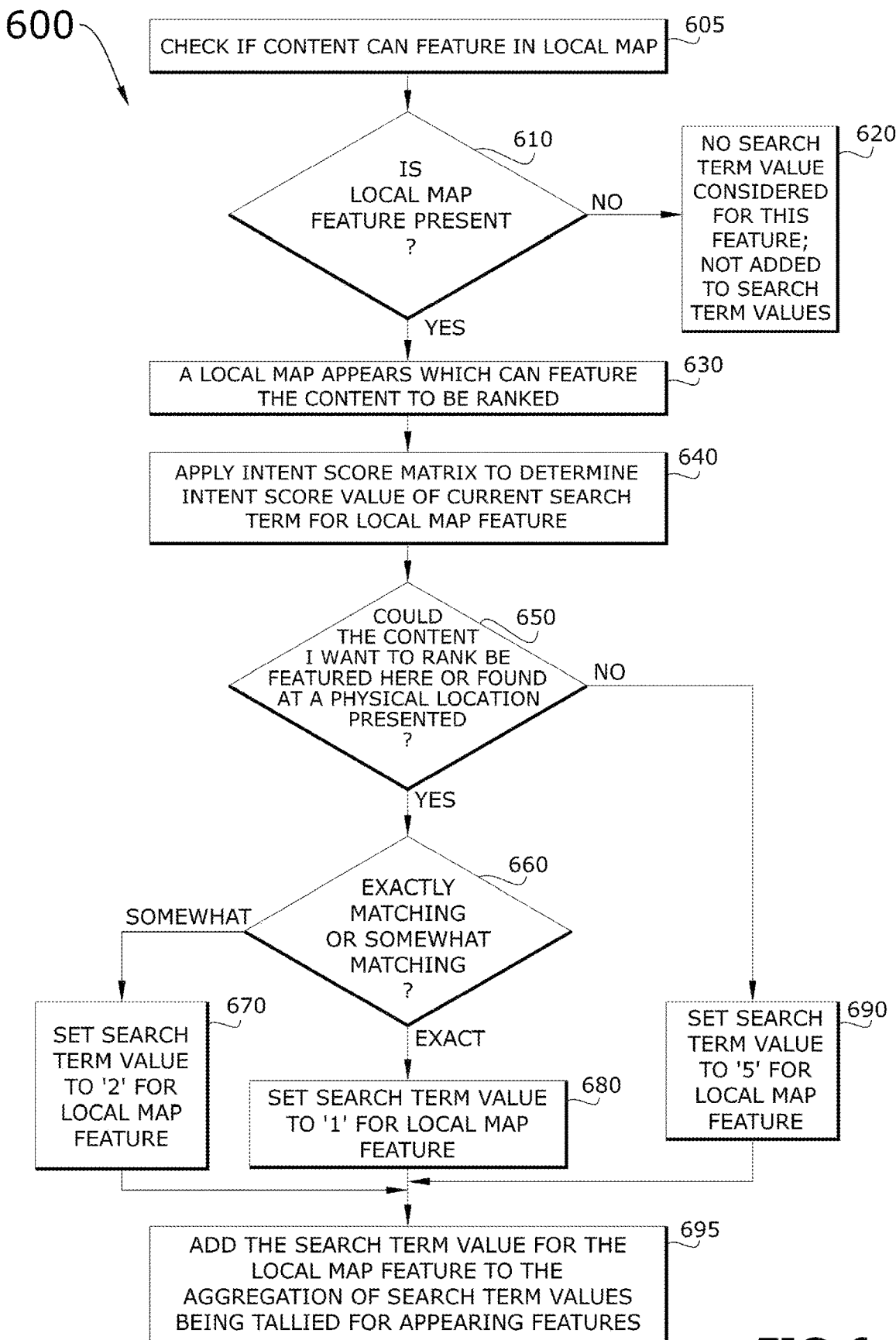
FIG. 6 conceptually illustrates an intent score matrix local map feature application process for determining a search term value for a local map feature that is capable of featuring the content to be ranked in some embodiments.

By way of a third feature example, FIG. 6 conceptually illustrates an intent score matrix local map feature application process for determining a search term value for a local map feature that is capable of featuring the content to be ranked 600 (hereinafter referred to as the "intent score matrix local map feature application process 600"). As shown in this figure, the intent score matrix local map feature application process 600 starts by checking if the content can feature in a local map feature (at 605). The intent score matrix local map feature application process 600 checks by determining (at 610) whether a local map feature is present or not. When a local map feature is determined (at 610) not to be present, no search term value is considered for the local map feature and the intent score matrix local map feature application process 600 does not add any value to the search term values (at 620). However, if a local map feature is affirmatively determined (at 610) to be present, then the local map appears (at 630) and the local map is one which can feature the content to be ranked.

In some embodiments, the intent score matrix local map feature application process 600 applies the intent score matrix to determine an intent score value of the current search term for the local map feature (at 640). In some embodiments, the intent score matrix local map feature application process 600 applies the intent score matrix by determining (at 650) whether the content to be ranked could be featured in the local map feature or at a physical location presented in the local map feature. When the content to be ranked could be featured in the local map feature or could be found physically at a location presented in the local map feature, the intent score matrix local map feature application process 600 proceeds forward to determine the search term value, which is described further below. On the other hand, when the content to be ranked could not be featured in the local map feature or found at a physical location presented in the local map feature, then the intent score matrix local map feature application process 600 sets the search term value to five ('5') for the local map feature (at 690) and adds the search term value (of five) for the local map feature to the aggregation of search term values being tallied for the appearing features (at 695).

Turning back to the determination (at 650), when the content to be ranked matches the content in the local map feature, the intent score matrix local map feature application process 600 determines (at 660) whether the content to be ranked exactly matches the content in the local map feature or only somewhat (partially) matches the content in the local map feature. When the content to be ranked only somewhat matches the content in the local map feature, the intent score matrix local map feature application process 600 sets the search term value to two ('2') for the local map feature (at 670) and proceeds to add the search term value (of two) for the local map feature to the aggregation of search term values being tallied for the appearing features (695). On the other hand, when the content to be ranked exactly matches the content in the local map feature, the intent score matrix local map feature application process 600 sets the search term value to one ('1') for the local map feature (at 680). Then the intent score matrix local map feature application process 600 adds the search term value (of one) for the local map feature to the aggregation of search term values being tallied for the appearing features (at 695). After adding the search term (either '1', '4', or '5' depending on matching status) for the shopping carousel feature to the aggregation of search term values being tallied for the appearing features, the intent score matrix local map feature application process 600 ends.

Figure 7:
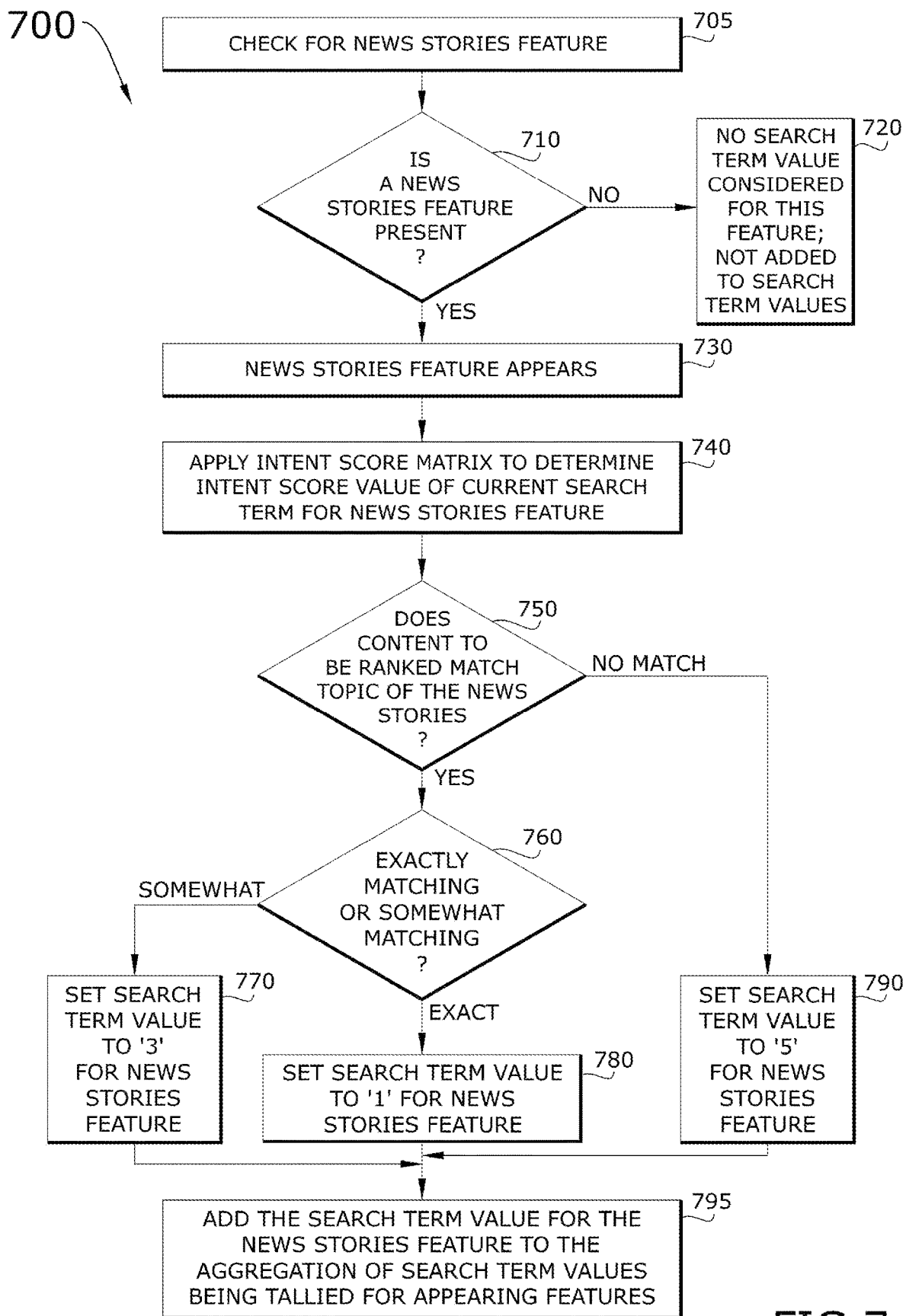
FIG. 7 conceptually illustrates an intent score matrix news stories feature application process for determining a search term value for a news stories feature appearing in content to be ranked in some embodiments.

By way of a fourth feature example, FIG. 7 conceptually illustrates an intent score matrix news stories feature application process for determining a search term value for a news stories feature appearing in content to be ranked 700 (hereinafter referred to as the "intent score matrix news stories feature application process 700"). As shown in this figure, the intent score matrix news stories feature application process 700 starts by checking for a news stories feature (at 705). The intent score matrix news stories feature application process 700 checks by determining (at 710) whether a news stories feature is present or not. When a news stories feature is determined (at 710) not to be present, no search term value is considered for the news stories feature and the intent score matrix news stories feature application process 700 does not add any value to the search term values (at 720). However, if a news stories feature is affirmatively determined (at 710) to be present, then the news stories feature appears (at 730).

In some embodiments, the intent score matrix news stories feature application process 700 applies the intent score matrix to determine an intent score value of the current search term for the news stories feature (at 740). In some embodiments, the intent score matrix news stories feature application process 700 applies the intent score matrix by determining (at 750) whether the content to be ranked matches content in the news stories feature. When the content to be ranked partially or fully matches the content in the news stories feature, the intent score matrix news stories feature application process 700 then determines the search term value, which is described further below. However, when the content to be ranked does not match the content in the news stories feature, the intent score matrix news stories feature application process 700 sets the search term value to five ('5') for the news stories feature (at 790) and adds the search term value (of five) for the news stories feature to the aggregation of search term values being tallied for the appearing features (at 795).

Turning back to the determination (at 750), when the content to be ranked matches the content in the news stories feature, the intent score matrix news stories feature application process 700 proceeds to the next step of determining (at 760) whether the content to be ranked exactly matches the content in the news stories feature or only somewhat (partially) matches the content in the news stories feature. When the content to be ranked only somewhat matches the content in the news stories feature, the intent score matrix news stories feature application process 700 of some embodiments sets the search term value to three ('3') for the news stories feature (at 770) and then adds the search term value (of three) for the news stories feature to the aggregation of search term values being tallied for the appearing features (at 795). On the other hand, when the content to be ranked exactly matches the content in the news stories feature, the intent score matrix news stories feature application process 700 sets the search term value to one ('1') for the news stories feature (at 780). Then the intent score matrix news stories feature application process 700 adds (at 795) the search term value (of one) for the news stories feature to the aggregation of search term values being tallied for the appearing features. After adding the search term (either '1', '3', or '5' depending on matching status) for the news stories feature to the aggregation of search term values being tallied for the appearing features, the intent score matrix news stories feature application process 700 ends.

Figure 8:
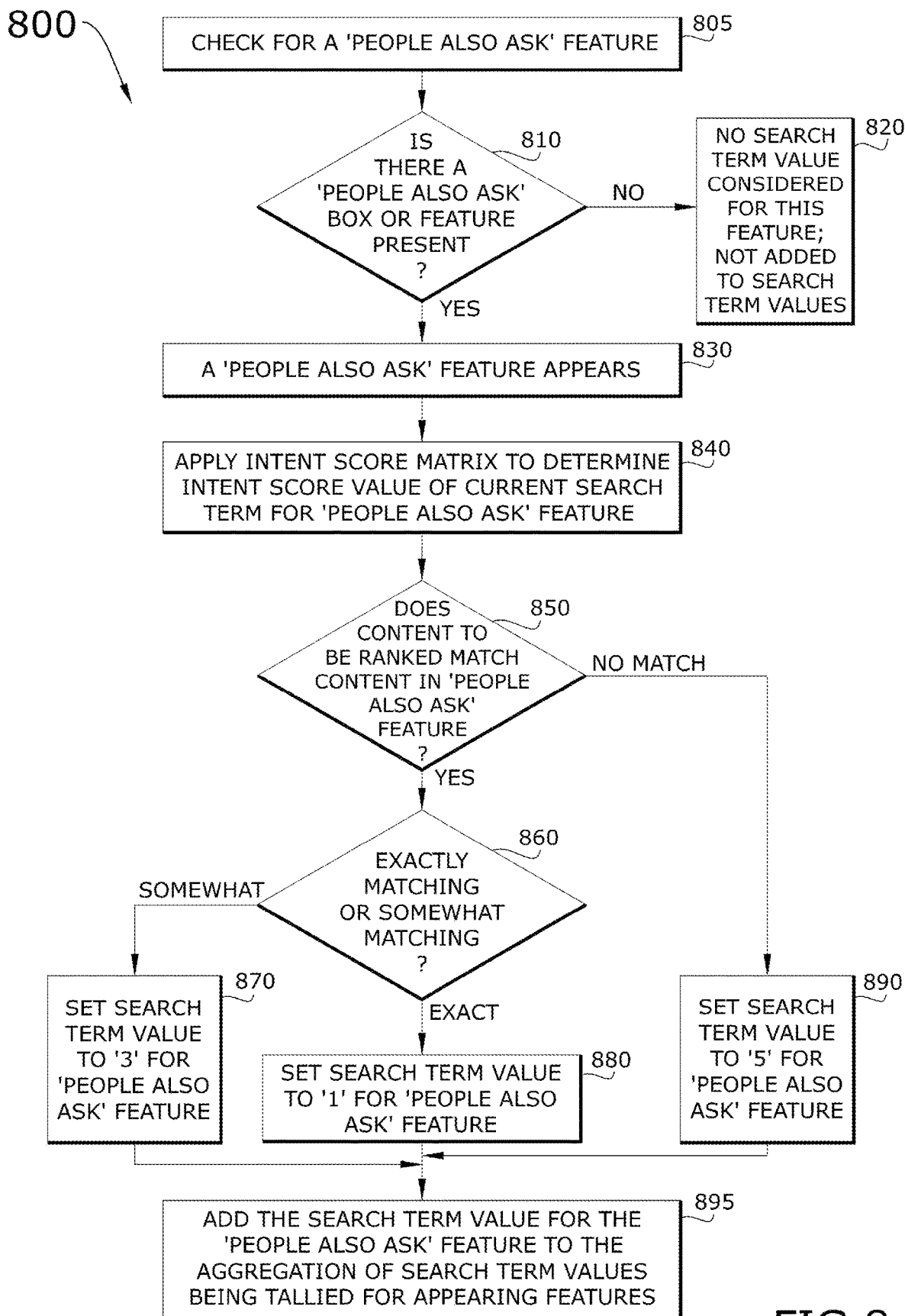
FIG. 8 conceptually illustrates an intent score matrix people also ask feature application process for determining a search term value for a people also ask feature appearing in content to be ranked in some embodiments.

By way of a fifth feature example, FIG. 8 conceptually illustrates an intent score matrix people also ask feature application process for determining a search term value for a people also ask feature appearing in content to be ranked 800 (hereinafter referred to as the "intent score matrix people also ask feature application process 800"). As shown in this figure, the intent score matrix people also ask feature application process 800 starts by checking for a people also ask feature (at 805). The intent score matrix people also ask feature application process 800 checks by determining (at 810) whether a 'people also ask' box or feature is present or not. When a people also ask box or feature is determined (at 810) not to be present, no search term value is considered for the news stories feature and the intent score matrix people also ask feature application process 800 does not add any value to the search term values (at 820). However, if a people also ask box or feature is affirmatively determined (at 810) to be present, then the people also ask feature appears (at 830).

In some embodiments, the intent score matrix people also ask feature application process 800 applies the intent score matrix to determine an intent score value of the current search term for the people also ask feature (at 840). In some embodiments, the intent score matrix people also ask feature application process 800 applies the intent score matrix by determining (at 850) whether the content to be ranked matches content in the people also ask feature. When the content to be ranked partially or fully matches the content in the people also ask feature, the intent score matrix people also ask feature application process 800 proceeds forward to determine the search term value, which is described further below. On the other hand, when the content to be ranked does not match the content in the people also ask feature, the intent score matrix people also ask feature application process 800 sets the search term value to five ('5') for the people also ask feature (at 890) and adds the search term value (of five) for the people also ask feature to the aggregation of search term values being tallied for the appearing features (at 895).

Turning back to the determination (at 850), when the content to be ranked matches the content in the people also ask feature, the intent score matrix people also ask feature application process 800 determines (at 860) whether the content to be ranked exactly matches the content in the people also ask feature or only somewhat (partially) matches the content in the people also ask feature. When the content to be ranked only somewhat matches the content in the people also ask feature, the intent score matrix people also ask feature application process 800 of some embodiments sets the search term value to three ('3') for the people also ask feature (at 870) and proceeds to add the search term value (of three) for the people also ask feature to the aggregation of search term values being tallied for the appearing features (at 895). On the other hand, when the content to be ranked exactly matches the content in the people also ask feature, the intent score matrix people also ask feature application process 800 sets the search term value to one ('1') for the people also ask feature (at 880). Then the intent score matrix people also ask feature application process 800 adds (at 895) the search term value (of one) for the people also ask feature to the aggregation of search term values being tallied for the appearing features. After adding the search term (either '1', '3', or '5' depending on matching status) for the people also ask feature to the aggregation of search term values being tallied for the appearing features, the intent score matrix people also ask feature application process 800 ends.

Figure 9:
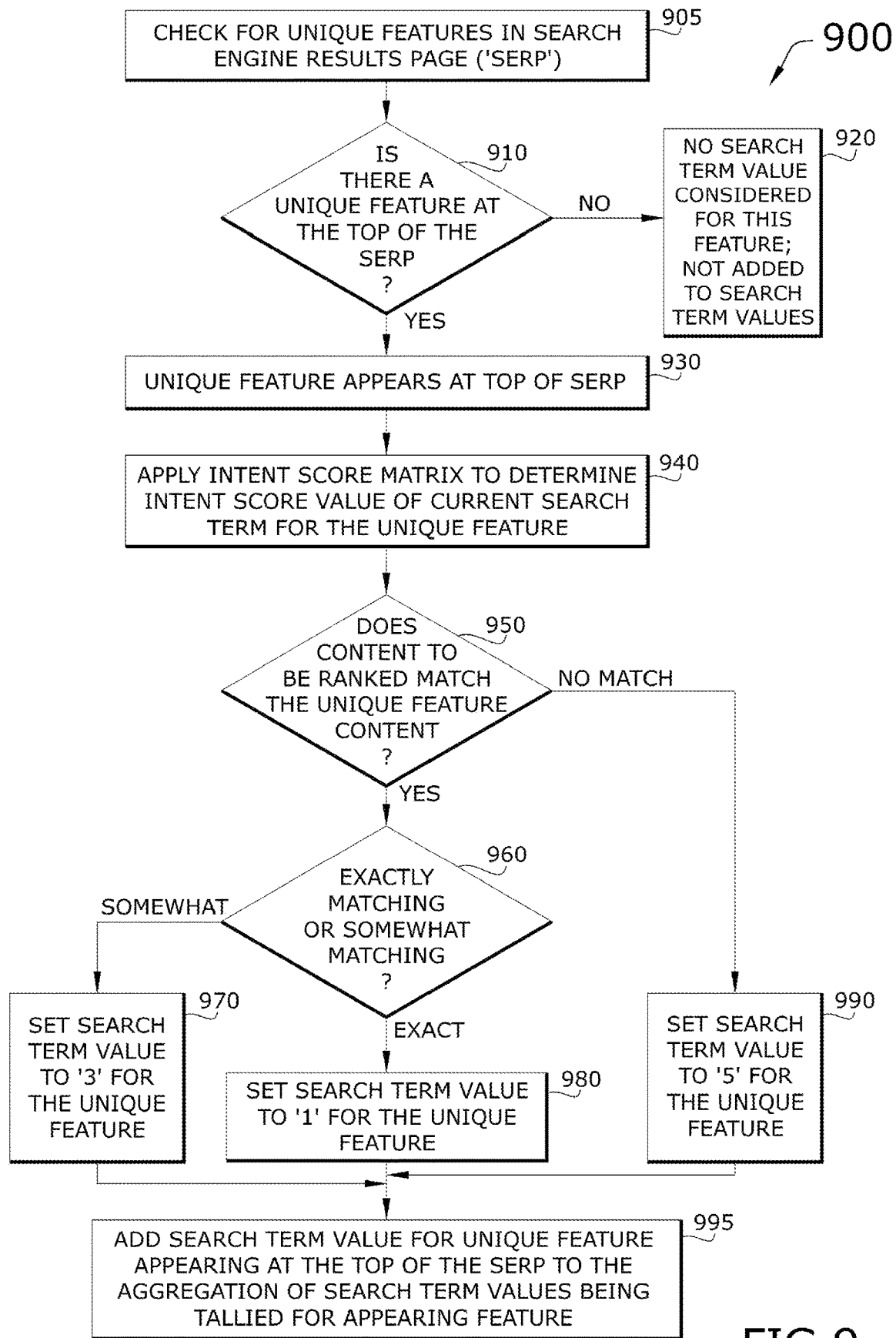
FIG. 9 conceptually illustrates an intent score matrix top unique feature application process for determining a search term value for a unique feature appearing at the top of a search engine results page (SERP) in some embodiments.

By way of a sixth feature example, FIG. 9 conceptually illustrates an intent score matrix top unique feature application process for determining a search term value for a unique feature appearing at the top of the SERP 900 (hereinafter referred to as the "intent score matrix top unique feature application process 900"). As shown in this figure, the intent score matrix top unique feature application process 900 starts by checking for unique features (at 905) in the search engine results page ("SERP"). The intent score matrix top unique feature application process 900 checks by determining (at 910) whether there is a unique feature at the top of the SERP. When a unique feature at the top of the SERP is determined (at 910) not to be present, no search term value is considered for the unique feature at the top of the SERP and the intent score matrix top unique feature application process 900 does not add any value to the search term values (at 920). However, if a unique feature is affirmatively determined (at 910) to be present at the top of the SERP, then the unique feature at the top of the SERP appears (at 930).

In some embodiments, the intent score matrix top unique feature application process 900 applies the intent score matrix to determine an intent score value of the current search term for the unique feature appearing at the top of the SERP (at 940). In some embodiments, the intent score matrix top unique feature application process 900 applies the intent score matrix by determining (at 950) whether the content to be ranked matches content in the unique feature appearing at the top of the SERP. When the content to be ranked partially or fully matches the content in the unique feature appearing at the top of the SERP, the intent score matrix top unique feature application process 900 proceeds forward to determine the search term value, which is described further below. On the other hand, when the content to be ranked does not match the content in the unique feature appearing at the top of the SERP, the intent score matrix top unique feature application process 900 sets the search term value to five ('5') for the unique feature appearing at the top of the SERP (at 990) and adds the search term value (of five) for the unique feature appearing at the top of the SERP to the aggregation of search term values being tallied for the appearing features (at 995).

Turning back to the determination (at 950), when the content to be ranked matches the content in the unique feature appearing at the top of the SERP, the intent score matrix top unique feature application process 900 determines (at 960) whether the content to be ranked exactly matches the content in the unique feature appearing at the top of the SERP or only somewhat (partially) matches the content in the unique feature appearing at the top of the SERP. When the content to be ranked only somewhat matches the content in the unique feature appearing at the top of the SERP, the intent score matrix top unique feature application process 900 sets the search term value to three ('3') for the unique feature appearing at the top of the SERP (at 970) and proceeds to add the search term value (of three) for the unique feature appearing at the top of the SERP to the aggregation of search term values being tallied for the appearing features (at 995). On the other hand, when the content to be ranked exactly matches the content in the unique feature appearing at the top of the SERP, the intent score matrix top unique feature application process 900 sets the search term value to one ('1') for the unique feature appearing at the top of the SERP (at 980). Then the intent score matrix top unique feature application process 900 adds (at 995) the search term value (of one) for the unique feature appearing at the top of the SERP to the aggregation of search term values being tallied for the appearing features. After adding the search term (either '1', '3', or '5' depending on matching status) for the unique feature appearing at the top of the SERP to the aggregation of search term values being tallied for the appearing features, the intent score matrix top unique feature application process 900 ends.

Figure 10:
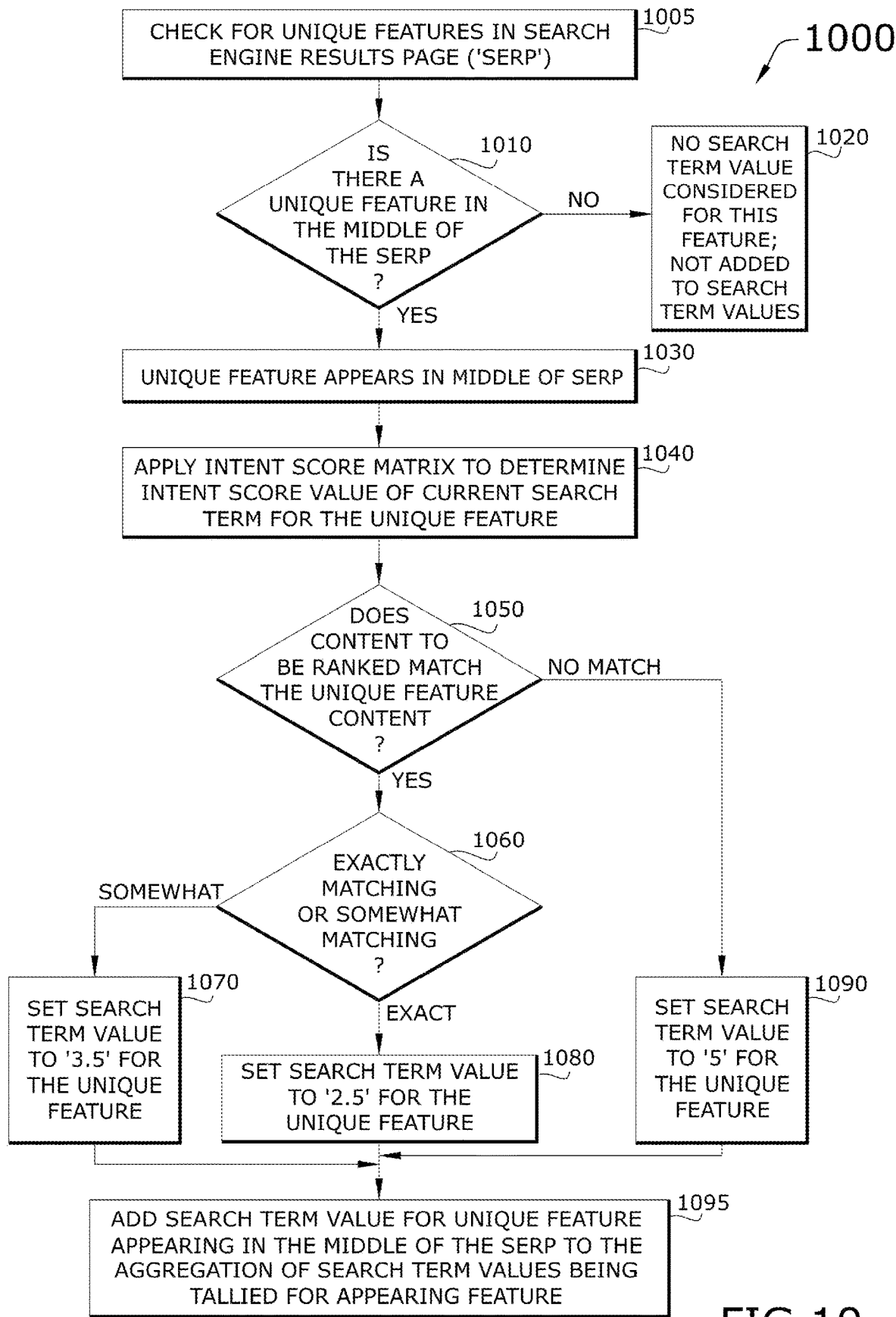
FIG. 10 conceptually illustrates an intent score matrix middle unique feature application process for determining a search term value for a unique feature appearing in the middle of the SERP in some embodiments.

By way of a seventh feature example, FIG. 10 conceptually illustrates an intent score matrix middle unique feature application process for determining a search term value for a unique feature appearing in the middle of the SERP 1000 (hereinafter referred to as the "intent score matrix middle unique feature application process 1000"). As shown in this figure, the intent score matrix middle unique feature application process 1000 starts by checking for unique features (at 1005) in the SERP. The intent score matrix middle unique feature application process 1000 checks by determining (at 1010) whether there is a unique feature in the middle of the SERP. When a unique feature in the middle of the SERP is determined (at 1010) not to be present, no search term value is considered for the unique feature in the middle of the SERP and the intent score matrix middle unique feature application process 1000 does not add any value to the search term values (at 1020). However, a unique feature in the middle of the SERP appears (at 1030) when determined (at 1010) to be present in the middle of the SERP.

In some embodiments, the intent score matrix middle unique feature application process 1000 applies the intent score matrix to determine an intent score value of the current search term for the unique feature appearing in the middle of the SERP (at 1040). In some embodiments, the intent score matrix middle unique feature application process 1000 applies the intent score matrix by determining (at 1050) whether the content to be ranked matches content in the unique feature appearing in the middle of the SERP. When the content to be ranked partially or fully matches the content in the unique feature appearing in the middle of the SERP, the intent score matrix middle unique feature application process 1000 proceeds forward to determine the search term value, which is described further below. On the other hand, when the content to be ranked does not match the content in the unique feature appearing in the middle of the SERP, the intent score matrix middle unique feature application process 1000 sets the search term value to five ('5') for the unique feature appearing in the middle of the SERP (at 1090) and adds the search term value (five) for the unique feature appearing in the middle of the SERP to the aggregation of search term values being tallied for the appearing features (at 1095).

Turning back to the determination (at 1050), when the content to be ranked matches the content in the unique feature appearing in the middle of the SERP, the intent score matrix middle unique feature application process 1000 determines (at 1060) whether the content to be ranked exactly matches or only somewhat (partially) matches the content in the unique feature appearing in the middle of the SERP. When the content to be ranked only somewhat matches the content in the unique feature appearing in the middle of the SERP, the intent score matrix middle unique feature application process 1000 of some embodiments sets the search term value to three and a half ('3.5') for the unique feature appearing in the middle of the SERP (at 1070) and proceeds to add the search term value ('3.5') for the unique feature appearing in the middle of the SERP to the aggregation of search term values being tallied for the appearing features (at 1095). On the other hand, when the content to be ranked exactly matches the content in the unique feature appearing in the middle of the SERP, the intent score matrix middle unique feature application process 1000 sets the search term value to two and a half ('2.5') for the unique feature appearing in the middle of the SERP (at 1080). Then the intent score matrix middle unique feature application process 1000 adds (at 1095) the search term value ('2.5') for the unique feature appearing in the middle of the SERP to the aggregation of search term values being tallied for the appearing features. After adding the search term (either '2.5', '3.5', or '5' depending on matching status) for the unique feature appearing in the middle of the SERP to the aggregation of search term values being tallied for the appearing features, the intent score matrix middle unique feature application process 1000 ends.

Figure 11:
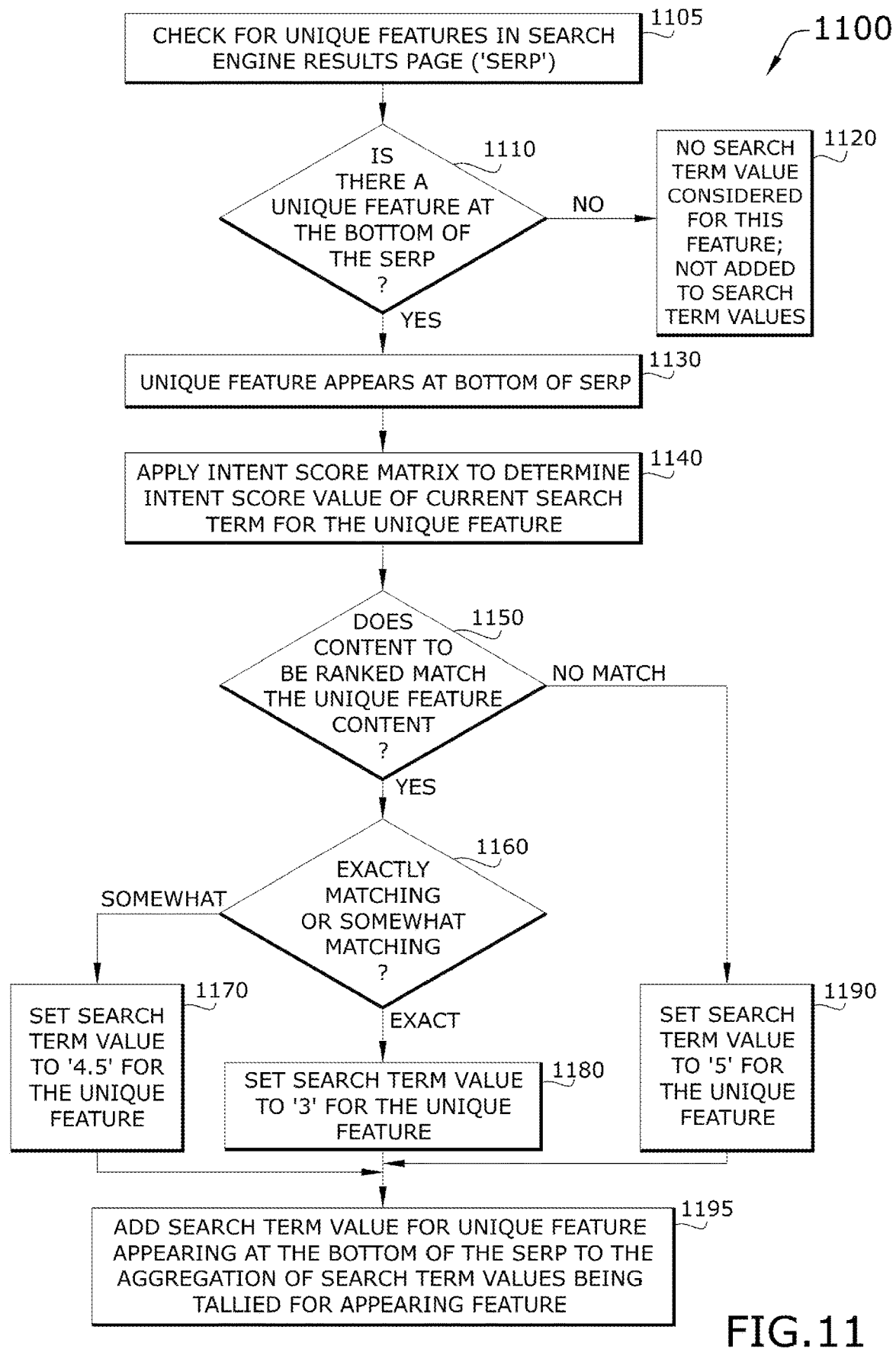
FIG. 11 conceptually illustrates an intent score matrix bottom unique feature application process for determining a search term value for a unique feature appearing at the bottom of the SERP in some embodiments.

By way of an eighth feature example, FIG. 11 conceptually illustrates an intent score matrix bottom unique feature application process for determining a search term value for a unique feature appearing at the bottom of the SERP 1100 (hereinafter referred to as the "intent score matrix bottom unique feature application process 1100"). As shown in this figure, the intent score matrix bottom unique feature application process 1100 starts by checking for unique features (at 1105) in the SERP. The intent score matrix bottom unique feature application process 1100 checks by determining (at 1110) whether there is a unique feature at the bottom of the SERP. When a unique feature at the bottom of the SERP is determined (at 1110) not to be present, no search term value is considered for the unique feature at the bottom of the SERP and the intent score matrix bottom unique feature application process 1100 does not add any value to the search term values (at 1120). However, if a unique feature is affirmatively determined (at 1110) to be present at the bottom of the SERP, then the unique feature at the bottom of the SERP appears (at 1130).

In some embodiments, the intent score matrix bottom unique feature application process 1100 applies the intent score matrix to determine an intent score value of the current search term for the unique feature appearing at the bottom of the SERP (at 1140). In some embodiments, the intent score matrix bottom unique feature application process 1100 applies the intent score matrix by determining (at 1150) whether the content to be ranked matches content in the unique feature appearing at the bottom of the SERP. When the content to be ranked partially or fully matches the content in the unique feature appearing at the bottom of the SERP, the intent score matrix bottom unique feature application process 1100 proceeds forward to determine the search term value, which is described further below. On the other hand, when the content to be ranked does not match the content in the unique feature appearing at the bottom of the SERP, the intent score matrix bottom unique feature application process 1100 sets the search term value to five ('5') for the unique feature appearing at the bottom of the SERP (at 1190) and adds the search term value (five) for the unique feature appearing at the bottom of the SERP to the aggregation of search term values being tallied for the appearing features (at 1195).

Turning back to the determination (at 1150), when the content to be ranked matches the content in the unique feature appearing at the bottom of the SERP, the intent score matrix bottom unique feature application process 1100 determines (at 1160) whether the content to be ranked exactly matches or only somewhat (partially) matches the content in the unique feature appearing at the bottom of the SERP. When the content to be ranked only somewhat matches the content in the unique feature appearing at the bottom of the SERP, the intent score matrix bottom unique feature application process 1100 then sets the search term value to four and a half ('4.5') for the unique feature appearing at the bottom of the SERP (at 1170) and proceeds to add the search term value ('4.5') for the unique feature appearing at the bottom of the SERP to the aggregation of search term values being tallied for the appearing features (at 1195). On the other hand, when the content to be ranked exactly matches the content in the unique feature appearing at the bottom of the SERP, the intent score matrix bottom unique feature application process 1100 sets the search term value to three ('3') for the unique feature appearing at the bottom of the SERP (at 1180). Then the intent score matrix bottom unique feature application process 1100 adds (at 1195) the search term value ('3') for the unique feature appearing at the bottom of the SERP to the aggregation of search term values being tallied for the appearing features. After adding the search term (either '3', '4.5', or '5') for the unique feature appearing at the bottom of the SERP to the aggregation of search term values being tallied for the appearing features, the intent score matrix bottom unique feature application process 1100 ends.

Figure 12:
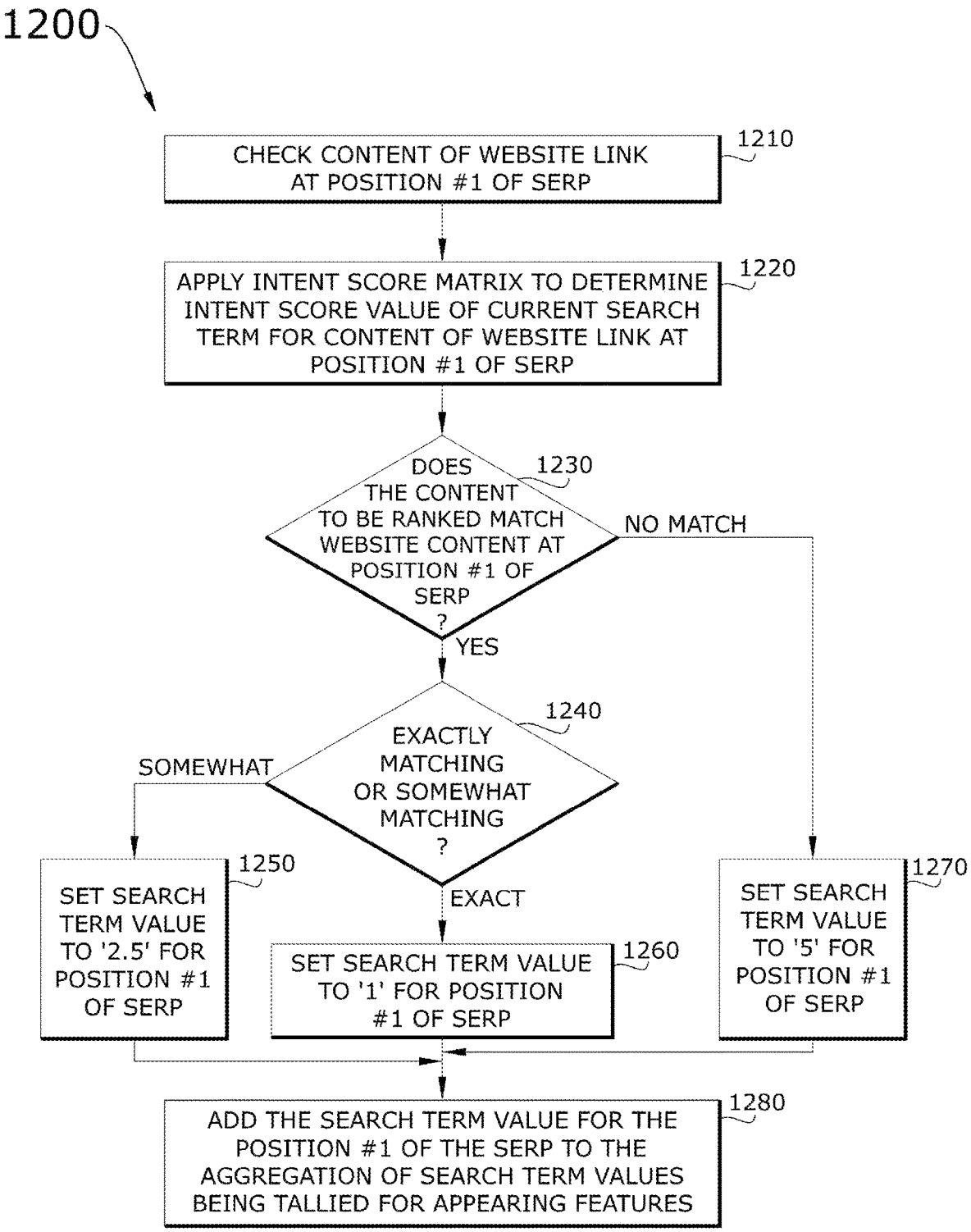
FIG. 12 conceptually illustrates an intent score matrix content position application process for determining a search term value for a first position of the SERP in some embodiments.

By way of a first search engine results page (SERP) position example, FIG. 12 conceptually illustrates an intent score matrix content position application process for determining a search term value for a first position of the SERP 1200 (hereinafter referred to as the "intent score matrix content first position application process 1200"). As shown in this figure, the intent score matrix content first position application process 1200 starts by checking content of the website link at the first position in the SERP (at 1210).

In some embodiments, the intent score matrix content first position application process 1200 applies the intent score matrix to determine the intent score value of the current search terms for content of the web site link at the first position of the SERP (at 1220). In doing so, the intent score matrix content first position application process 1200 determines (at 1230) whether the content to be ranked matches the content of the first position in the SERP.

In some embodiments, when there is no match, the intent score matrix content first position application process 1200 sets the search term value to five ('5') for the first position of the SERP (at 1270). On the other hand, when there is at least partial match determined (at 1230), then the intent score matrix content first position application process 1200 proceeds to a step for determining (at 1240) whether the content to be ranked exactly matches or only somewhat matches the website content at the first position of the SERP. In particular, when there is an exact match determined (at 1240), the intent score matrix content first position application process 1200 sets the search term value to one ('1') for the first position of the SERP (at 1260). Alternately, when it is determined (at 1240) that the content to be ranked only somewhat matches the website content at the first position of the SERP, then the search term value is set (at 1250) to two and a half ('2.5') for the first position of the SERP.

Finally, the intent score matrix content first position application process 1200 adds the search term value ('1', '2.5', or '5') for the first position of the SERP to the aggregation of search term values being tallied for the appearing features (at 1280) and then ends.

Figure 13:
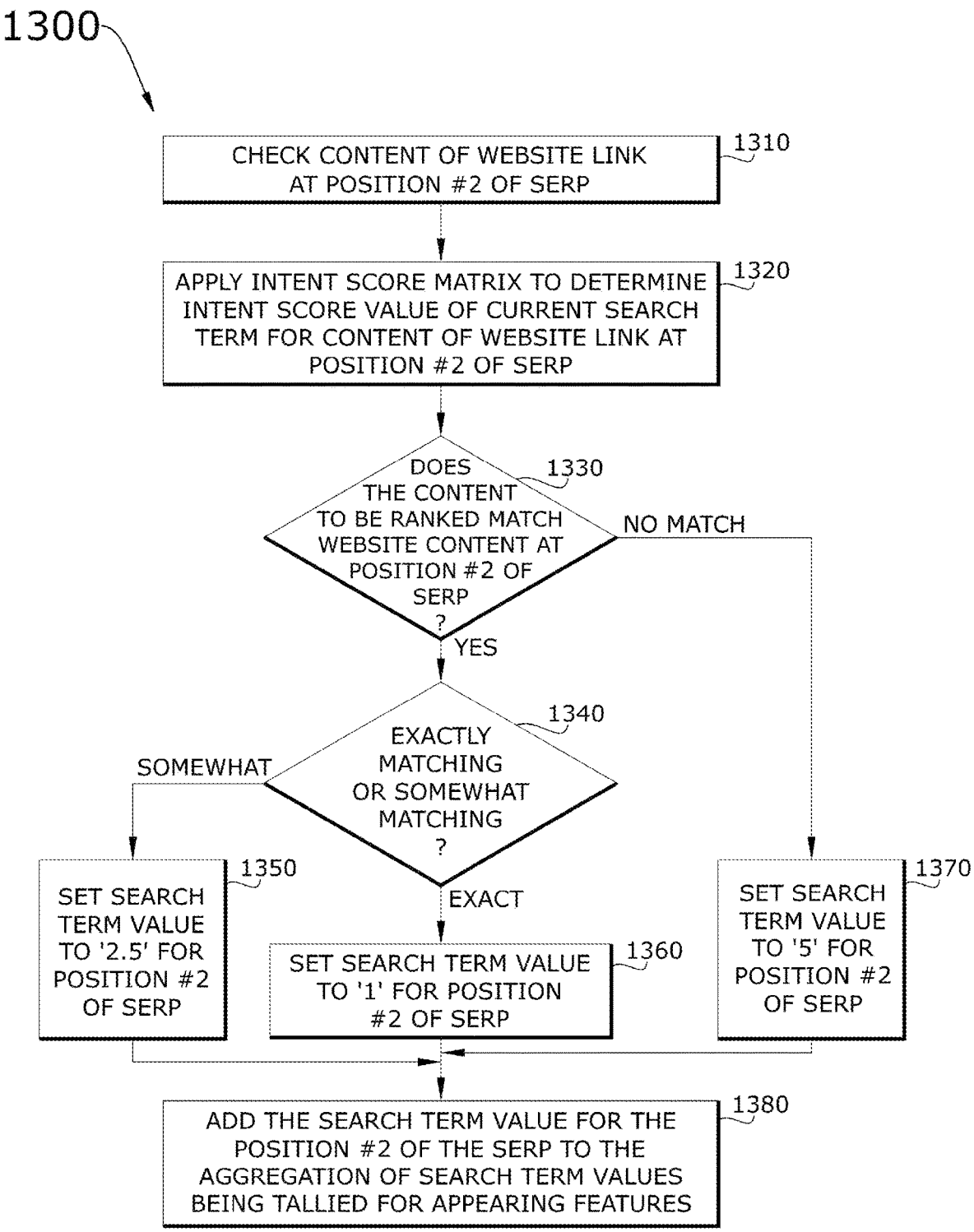
FIG. 13 conceptually illustrates an intent score matrix content position application process for determining a search term value for a second position of the SERP in some embodiments.

By way of a second SERP position example, FIG. 13 conceptually illustrates an intent score matrix content position application process for determining a search term value for a second position of the SERP 1300 (hereinafter referred to as the "intent score matrix content second position application process 1300"). As shown in this figure, the intent score matrix content second position application process 1300 starts by checking content of the website link at the second position in the SERP (at 1310). Next, the intent score matrix content second position application process 1300 applies the intent score matrix to determine the intent score value of the current search terms for content of the website link at the second position of the SERP (at 1320). In doing so, the intent score matrix content second position application process 1300 determines (at 1330) whether the content to be ranked matches the content of the second position in the SERP or not. When there is no match, the intent score matrix content second position application process 1300 sets the search term value to five ('5') for the second position of the SERP (at 1370). However, when there is at least partial match determined (at 1330), then the intent score matrix content second position application process 1300 proceeds to a step for determining (at 1340) whether the content to be ranked exactly matches or only somewhat matches the website content at the second position of the SERP. When there is an exact match determined (at 1340), the intent score matrix content second position application process 1300 sets the search term value to one ('1') for the second position of the SERP (at 1360). However, when it is determined (at 1340) that the content to be ranked only somewhat matches the web site content at the second position of the SERP, then the intent score matrix content second position application process 1300 sets the search term value to two and a half ('2.5') for the second position of the SERP (at 1350). Finally, the intent score matrix content second position application process 1300 adds the search term value (either '1', '2.5', or '5' depending on match status) for the second position of the SERP to the aggregation of search term values being tallied for the appearing features (at 1380). Then the intent score matrix content second position application process 1300 ends.

Figure 14:
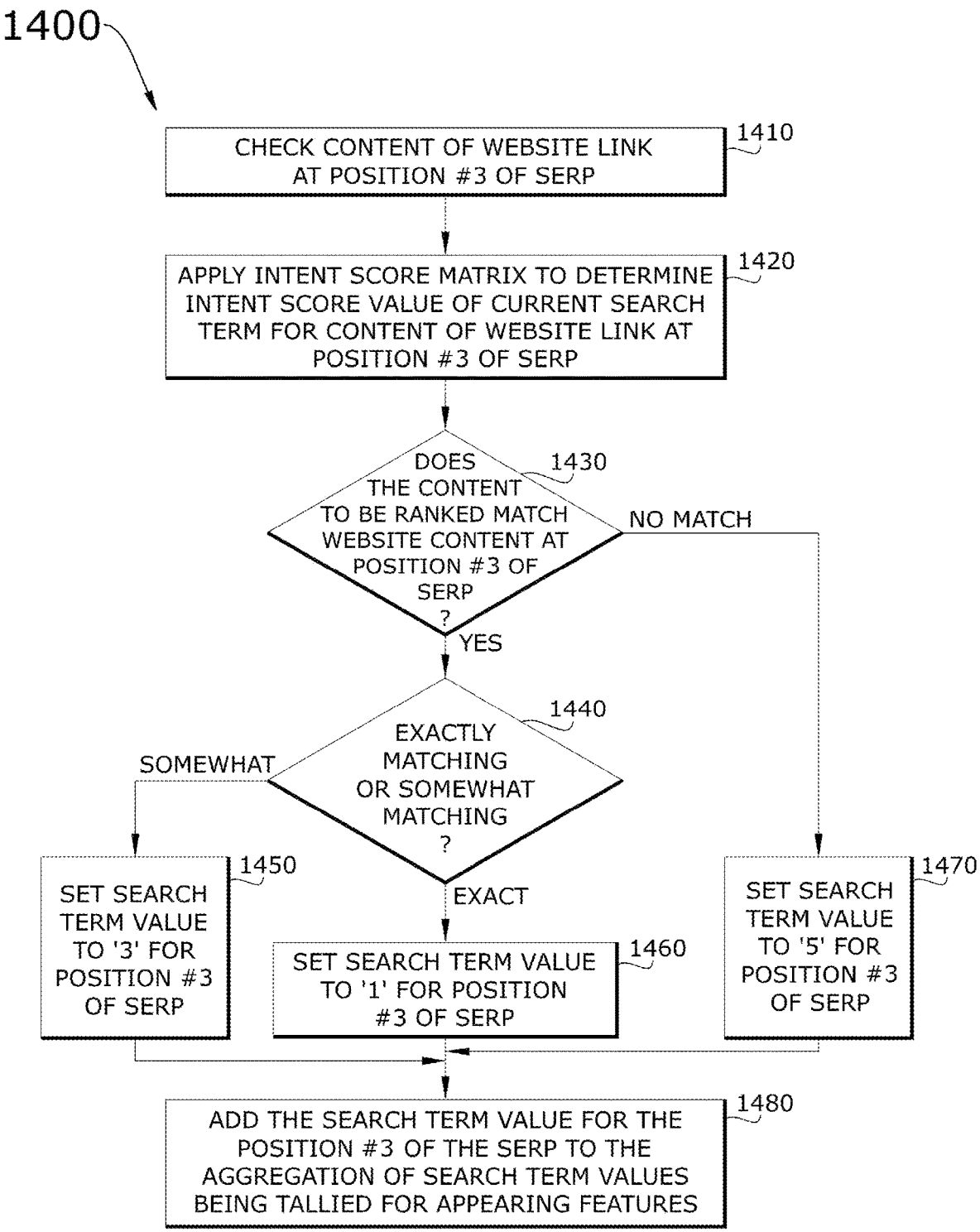
FIG. 14 conceptually illustrates an intent score matrix content position application process for determining a search term value for a third position of the SERP in some embodiments.

By way of a third SERP position example, FIG. 14 conceptually illustrates an intent score matrix content position application process for determining a search term value for a third position of the SERP 1400 (hereinafter referred to as the "intent score matrix content third position application process 1400"). As shown in this figure, the intent score matrix content third position application process 1400 starts by checking content of the website link at the third position in the SERP (at 1410) and then applies the intent score matrix to determine the intent score value of the current search terms for content of the website link at the third position of the SERP (at 1420). The intent score matrix content third position application process 1400 determines (at 1430) whether the content to be ranked matches the content of the third position in the SERP or not. When there is no match, the intent score matrix content third position application process 1400 sets the search term value to five ('5') for the third position of the SERP (at 1470). However, when there is at least partial match determined (at 1430), then the intent score matrix content third position application process 1400 proceeds to a step for determining (at 1440) whether the content to be ranked exactly matches or only somewhat matches the website content at the third position of the SERP. When there is an exact match determined (at 1440), the intent score matrix content third position application process 1400 sets the search term value to one ('1') for the third position of the SERP (at 1460). However, when it is determined (at 1440) that the content to be ranked only somewhat matches the website content at the third position of the SERP, then the intent score matrix content third position application process 1400 sets the search term value to three ('3') for the third position of the SERP (at 1450). Finally, the intent score matrix content third position application process 1400 adds the search term value (either '1', '3', or '5') for the third position of the SERP to the aggregation of search term values being tallied for the appearing features (at 1480). Then the intent score matrix content third position application process 1400 ends.

Figure 15:
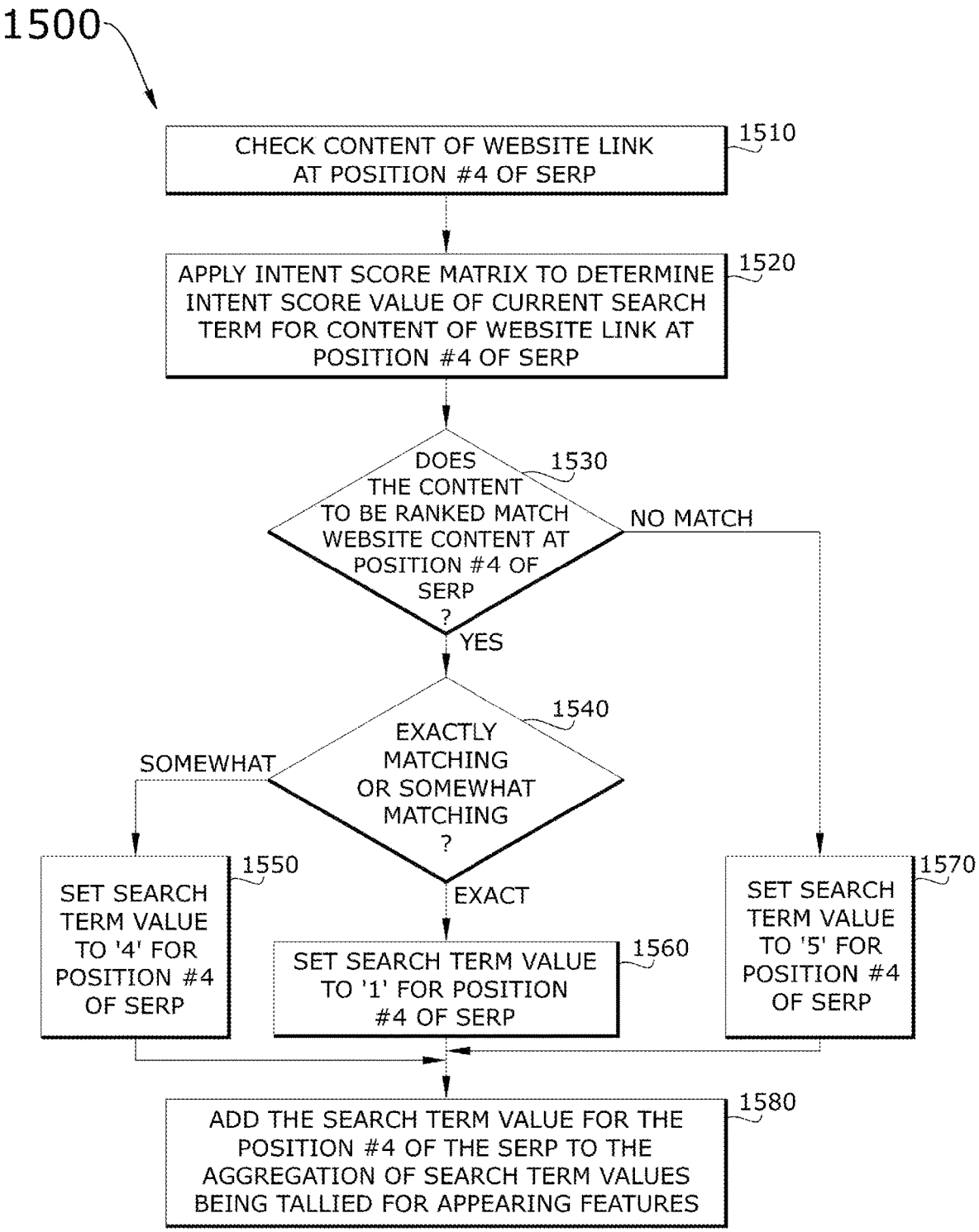
FIG. 15 conceptually illustrates an intent score matrix content position application process for determining a search term value for a fourth position of the SERP in some embodiments.

By way of a fourth SERP position example, FIG. 15 conceptually illustrates an intent score matrix content position application process for determining a search term value for a fourth position of the SERP 1500 (hereinafter referred to as the "intent score matrix content fourth position application process 1500"). As shown in this figure, the intent score matrix content fourth position application process 1500 starts by checking web site link content at the fourth SERP position (at 1510) and determining the intent score value by application of the intent score matrix (at 1520) based on determining (at 1530) whether the content to be ranked matches the content of the fourth position in the SERP or not. When there is no match, the intent score matrix content fourth position application process 1500 sets the search term value to five ('5') for the fourth position of the SERP (at 1570). However, when there is at least partial match determined (at 1530), then the intent score matrix content fourth position application process 1500 proceeds to a step for determining (at 1540) whether the content to be ranked exactly matches or only somewhat matches the web site content at the fourth position of the SERP. When there is an exact match determined (at 1540), the intent score matrix content fourth position application process 1500 sets the search term value to one ('1') for the fourth position of the SERP (at 1560). However, when it is determined (at 1540) that the content to be ranked only somewhat matches the web site content at the fourth position of the SERP, then the intent score matrix content fourth position application process 1500 sets the search term value to four ('4') for the fourth position of the SERP (at 1550). Then the intent score matrix content fourth position application process 1500 adds the search term value (either '1', '4', or '5') for the fourth position of the SERP to the aggregation of search term values being tallied for the appearing features (at 1580). Then the intent score matrix content fourth position application process 1500 ends.

Figure 16:
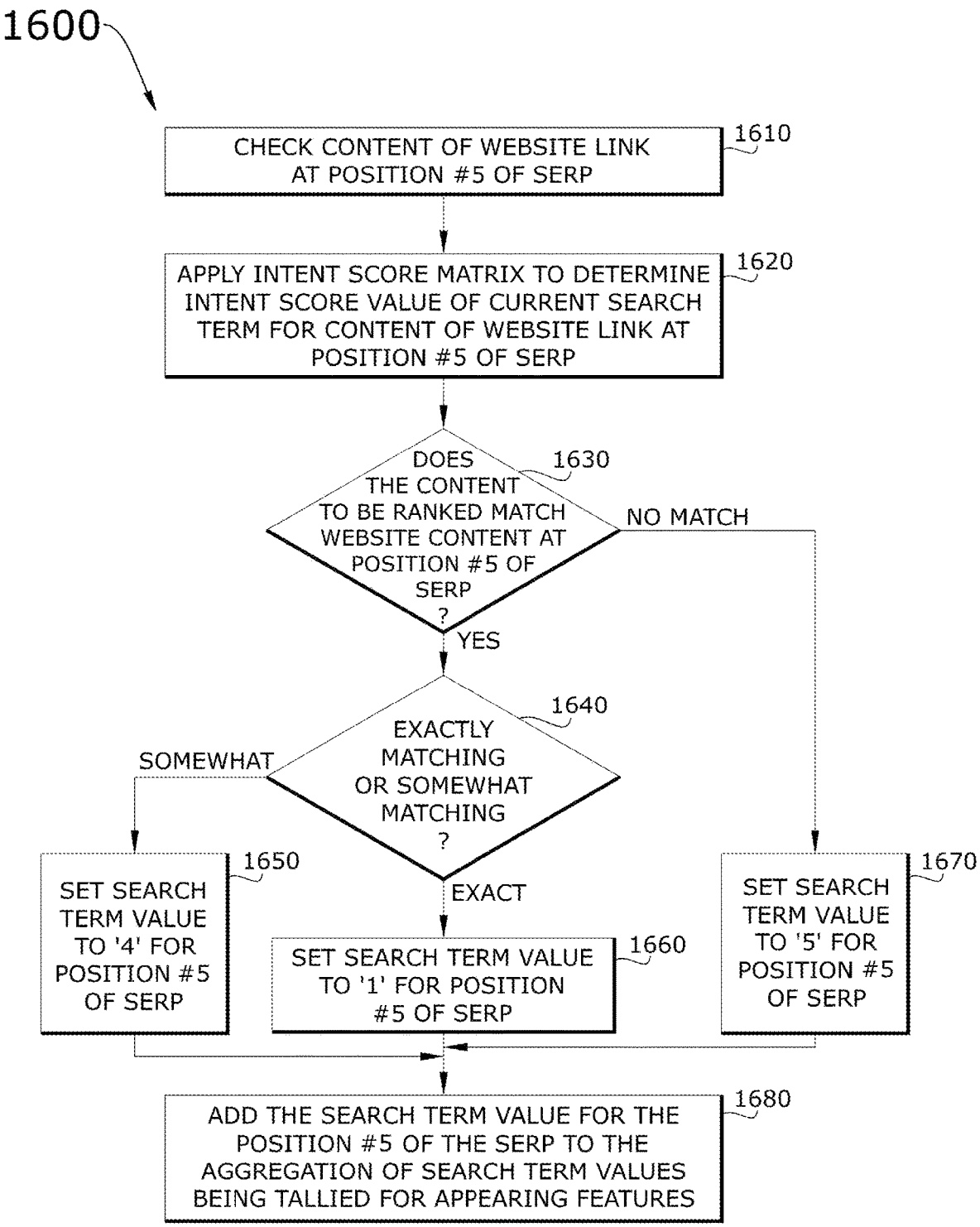
FIG. 16 conceptually illustrates an intent score matrix content position application process for determining a search term value for a fifth position of the SERP in some embodiments.

By way of a fifth SERP position example, FIG. 16 conceptually illustrates an intent score matrix content position application process for determining a search term value for a fifth position of the SERP 1600 (hereinafter referred to as the "intent score matrix content fifth position application process 1600"). As shown in this figure, the intent score matrix content fifth position application process 1600 starts by checking content at the fifth SERP position (at 1610) and applying the intent score matrix (at 1620) to determine (at 1630) whether the content to be ranked matches the content of the fifth position in the SERP or not. When there is no match, the search term value for the fifth position of the SERP is set (at 1670) to five ('5'). When there is some matching content, then the intent score matrix content fifth position application process 1600 determines (at 1640) whether exactly matching or only somewhat (partially) matching. When there is an exact match between the content to be ranked and content of the web link at the fifth position of the SERP, the intent score matrix content fifth position application process 1600 sets the search term value to one ('1') for the fifth position of the SERP (at 1660). However, when the content only somewhat matches, the intent score matrix content fifth position application process 1600 sets the search term value to four ('4') for the fifth position of the SERP (at 1650). Next, the intent score matrix content fifth position application process 1600 adds (at 1680) the search term value (either '1', '4', or '5') for the fifth position of the SERP to the aggregation of search term values and then ends.

Figure 17:
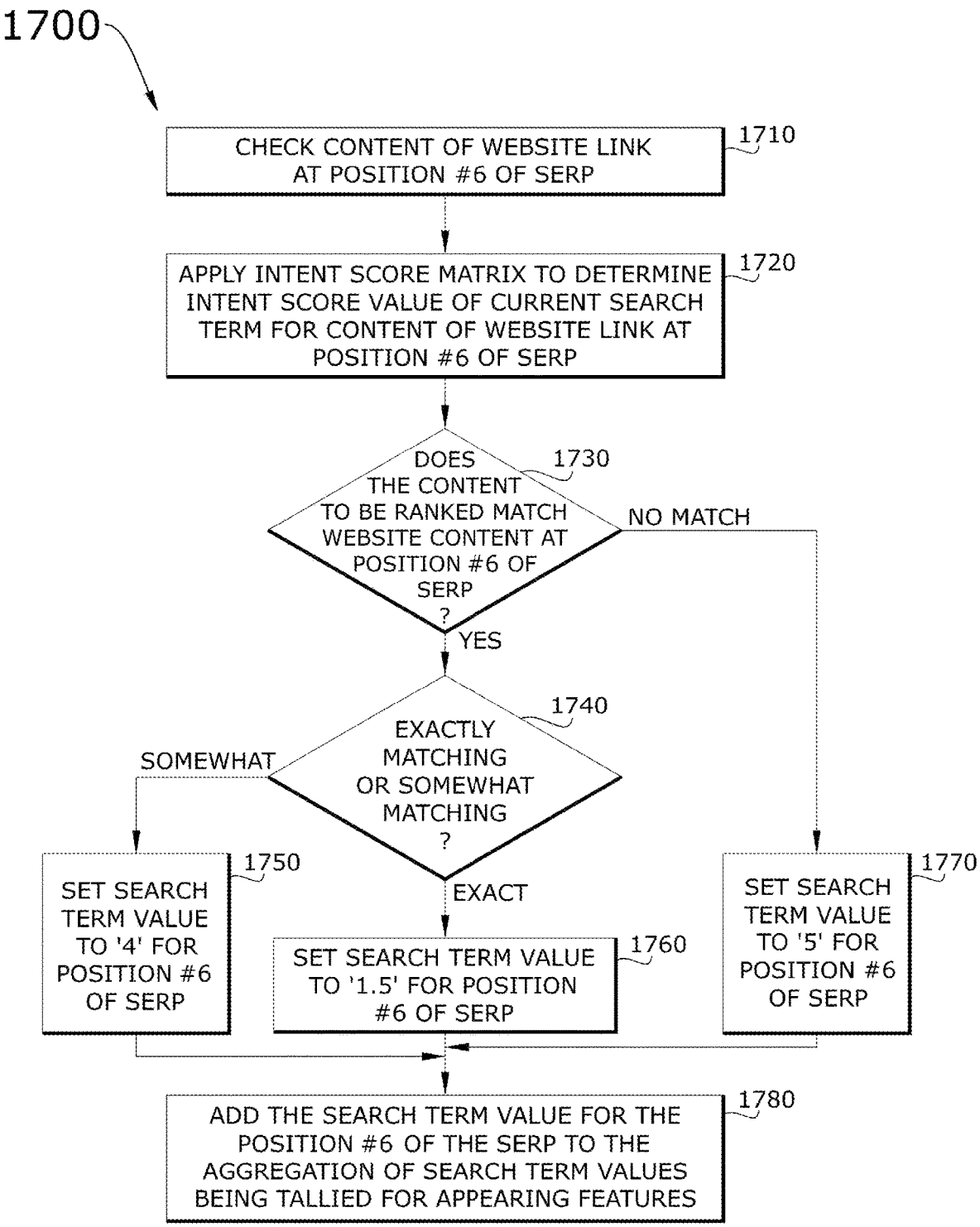
FIG. 17 conceptually illustrates an intent score matrix content position application process for determining a search term value for a sixth position of the SERP in some embodiments.

By way of a sixth SERP position example, FIG. 17 conceptually illustrates an intent score matrix content position application process for determining a search term value for a sixth position of the SERP 1700 (hereinafter referred to as the "intent score matrix content sixth position application process 1700"). As shown in this figure, the intent score matrix content sixth position application process 1700 starts by checking content at the sixth SERP position (at 1710), applying the intent score matrix (at 1720), and determining (at 1730) whether the content to be ranked matches the content of the sixth position in the SERP. When a match is determined (at 1730), the intent score matrix content sixth position application process 1700 proceeds to characterize the match as either partial or exact, which is described below. On the other hand, when no match between the content is determined (at 1730), then the search term value for the sixth position of the SERP is set (at 1770) to five ('5'). When there is some overlap of content that is determined to match (at 1730), then the intent score matrix content sixth position application process 1700 determines (at 1740) if the match is an exact match or only somewhat matching. In some embodiments, the intent score matrix content sixth position application process 1700 sets the search term value to four ('4') for the sixth position of the SERP (at 1750) when there is a partial match, but sets the search term value to one and a half ('1.5') for the sixth position of the SERP (at 1760) when there is an exact match. Then the search term value ('1.5', '4', or '5') for the sixth position of the SERP is added (at 1780) to the aggregation of search term values and the intent score matrix content sixth position application process 1700 ends.

Figure 18:
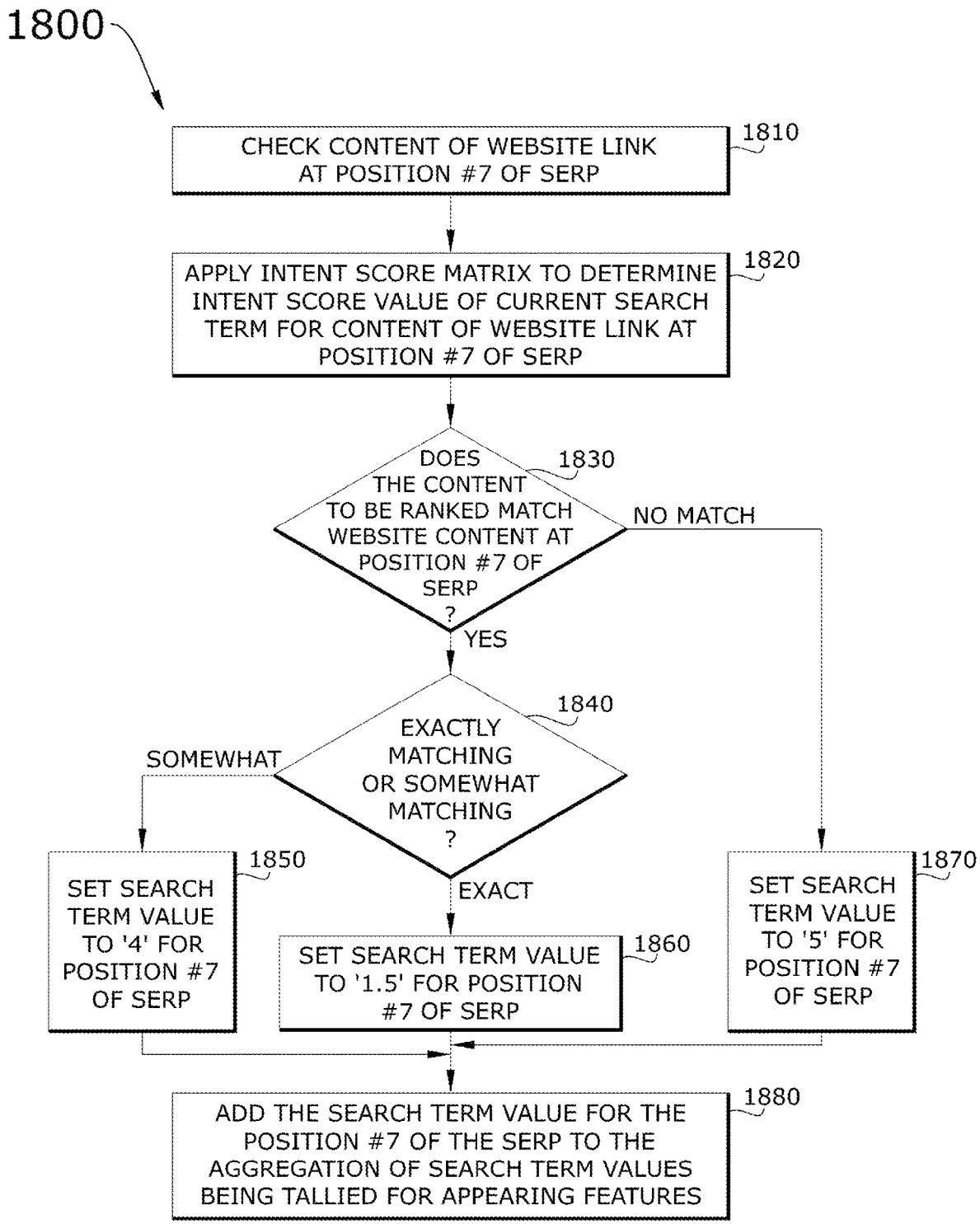
FIG. 18 conceptually illustrates an intent score matrix content position application process for determining a search term value for a seventh position of the SERP in some embodiments.

By way of a seventh SERP position example, FIG. 18 conceptually illustrates an intent score matrix content position application process for determining a search term value for a seventh position of the SERP 1800 (hereinafter referred to as the "intent score matrix content seventh position application process 1800"). As shown in this figure, the intent score matrix content seventh position application process 1800 starts by checking content at the seventh SERP position (at 1810), applying the intent score matrix (at 1820), and determining (at 1830) whether the content to be ranked matches the content of the seventh position in the SERP. When there is no match determined (at 1830), the search term value for the seventh position of the SERP is set (at 1870) to five ('5'). On the other hand, when a match is affirmatively determined (at 1830), the intent score matrix content seventh position application process 1800 determines (at 1840) if the match is an exact match or somewhat matching. The intent score matrix content seventh position application process 1800 sets the search term value to four ('4') for the seventh position of the SERP (at 1850) when content somewhat matches, but sets the search term value to one and a half ('1.5') for the seventh position of the SERP (at 1860) when there is an exact match. Then the search term value ('1.5', '4', or '5') for the seventh position of the SERP is added (at 1880) to the aggregation of search term values and the intent score matrix content seventh position application process 1800 ends.

Figure 19:
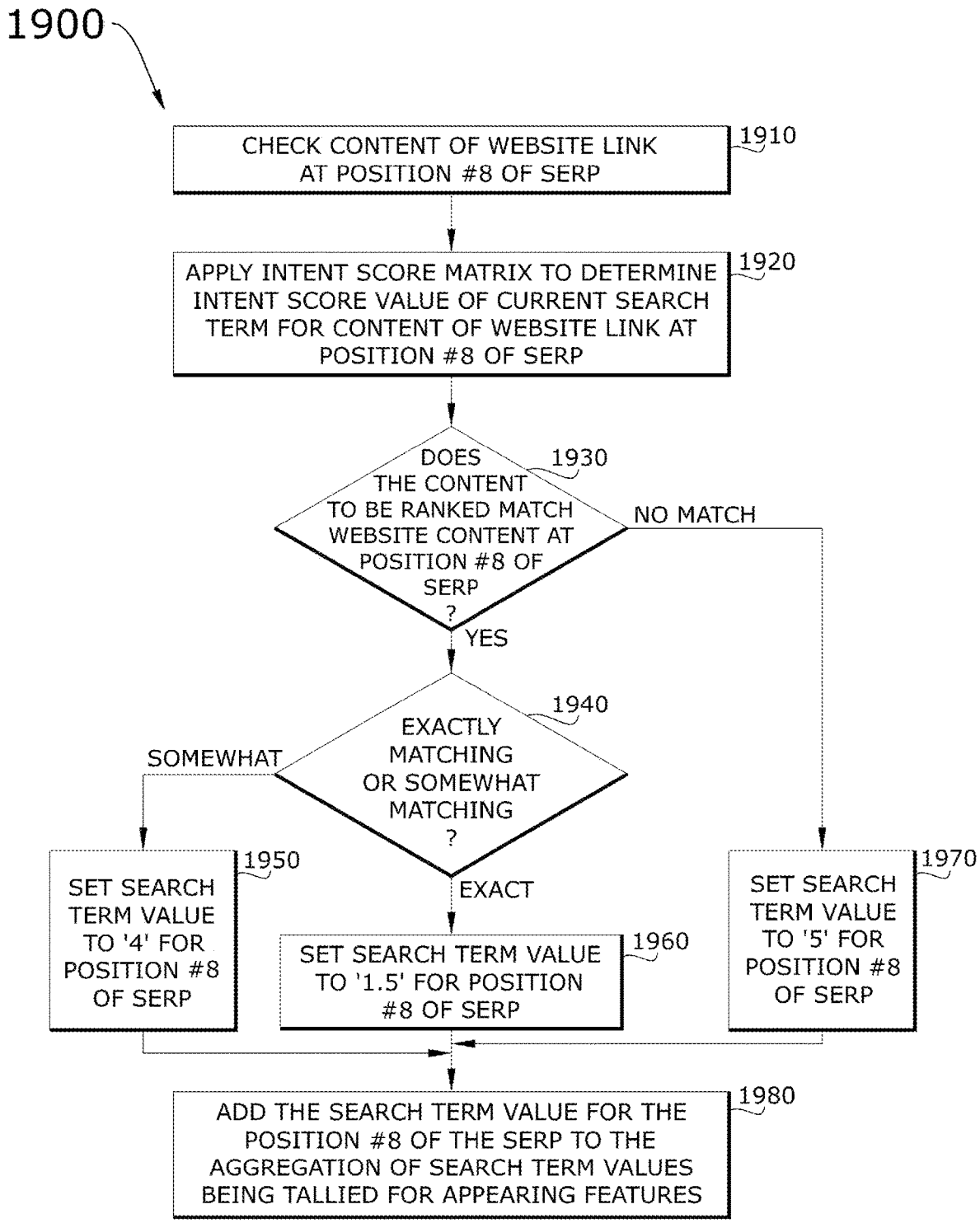
FIG. 19 conceptually illustrates an intent score matrix content position application process for determining a search term value for an eighth position of the SERP in some embodiments.

By way of an eighth SERP position example, FIG. 19 conceptually illustrates an intent score matrix content position application process for determining a search term value for an eighth position of the SERP 1900 (hereinafter referred to as the "intent score matrix content eighth position application process 1900"). As shown in this figure, the intent score matrix content eighth position application process 1900 starts by checking content at the eighth position of the SERP (at 1910), applying the intent score matrix (at 1920), and determining (at 1930) whether the content to be ranked matches the content of the eighth position in the SERP. The search term value for the eighth position of the SERP is set (at 1970) to five ('5') when the content does not match. On the other hand, when a match is affirmatively determined (at 1930), the intent score matrix content eighth position application process 1900 determines (at 1940) whether the match is an exact match or somewhat matching. The intent score matrix content eighth position application process 1900 sets the search term value for the eighth position of the SERP to four ('4') when somewhat matching (at 1950) and sets to one and a half ('1.5') when exactly matching (at 1960). Then the search term value for the eighth position of the SERP ('1.5', '4', or '5') is added (at 1980) to the aggregation of search term values and the intent score matrix content eighth position application process 1900 ends.

Figure 20:
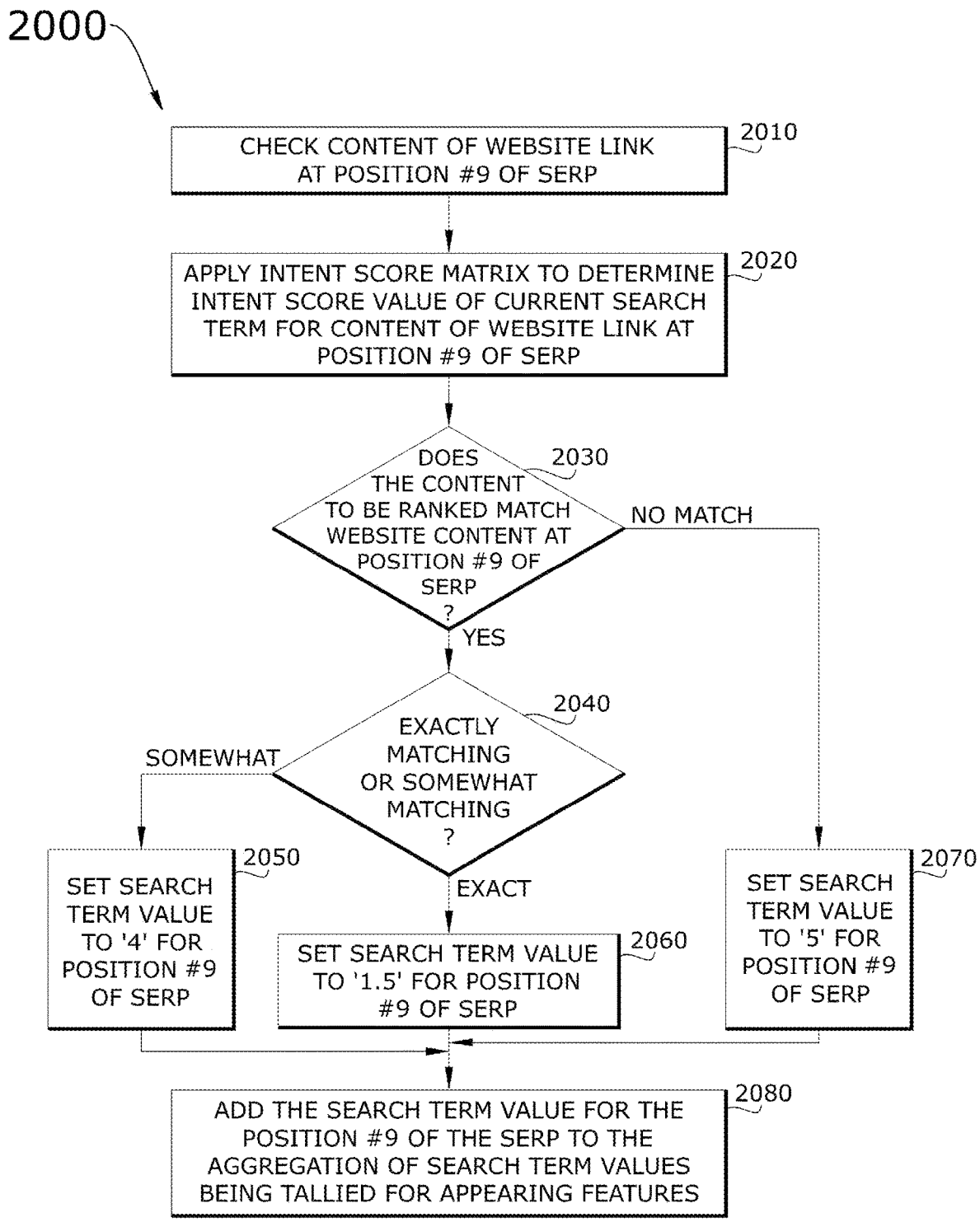
FIG. 20 conceptually illustrates an intent score matrix content position application process for determining a search term value for a ninth position of the SERP in some embodiments.

By way of a ninth SERP position example, FIG. 20 conceptually illustrates an intent score matrix content position application process for determining a search term value for a ninth position of the SERP 2000 (hereinafter referred to as the "intent score matrix content ninth position application process 2000"). As shown in this figure, the intent score matrix content ninth position application process 2000 starts by checking content at the ninth position of the SERP (at 2010), applying the intent score matrix (at 2020), and determining (at 2030) whether the content to be ranked matches the content of the ninth position in the SERP. The search term value for the ninth position of the SERP is set (at 2070) to five ('5') when the content does not match. On the other hand, when a match is affirmatively determined (at 2030), the intent score matrix content ninth position application process 2000 determines (at 2040) whether the match is an exact match or somewhat matching. The intent score matrix content ninth position application process 2000 sets the search term value for the ninth position of the SERP to four ('4') when somewhat matching (at 2050) and sets to one and a half ('1.5') when exactly matching (at 2060). Then the search term value for the ninth position of the SERP ('1.5', '4', or '5') is added (at 2080) to the aggregation of search term values and the intent score matrix content ninth position application process 2000 ends.

Figure 21:
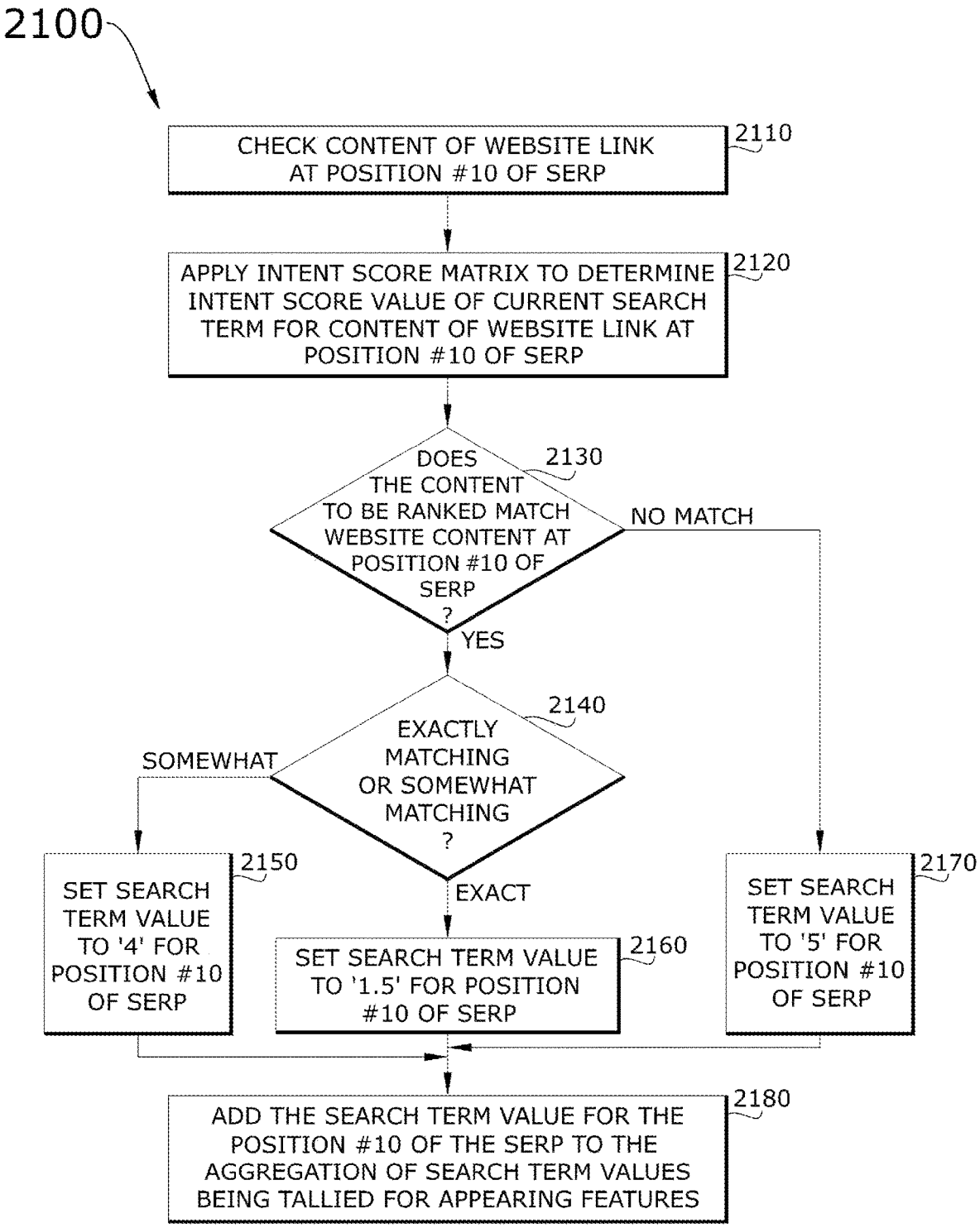
FIG. 21 conceptually illustrates an intent score matrix content position application process for determining a search term value for a tenth position of the SERP in some embodiments.

By way of a tenth SERP position example, FIG. 21 conceptually illustrates an intent score matrix content position application process for determining a search term value for a tenth position of the SERP 2100 (hereinafter referred to as the "intent score matrix content tenth position application process 2100") which starts by checking content at the tenth position of the SERP (at 2110), applying the intent score matrix (at 2120), and determining (at 2130) whether the content to be ranked matches the content of the tenth position in the SERP. The search term value for the tenth position of the SERP is set (at 2170) to five ('5') when the content does not match. On the other hand, when a match is affirmatively determined (at 2130), the intent score matrix content tenth position application process 2100 determines (at 2140) whether the match is an exact match or somewhat matching. The intent score matrix content tenth position application process 2100 sets the search term value for the tenth position of the SERP to four ('4') when somewhat matching (at 2150) and sets to one and a half ('1.5') when exactly matching (at 2160). Then the search term value for the tenth position of the SERP '4', or '5') is added (at 2180) to the aggregation of search term values and the intent score matrix content tenth position application process 2100 ends.

In the examples above describing intent score matrix content position application processes for determining the search term value for each of the first ten positions (or 'ordered positions') of the SERP are intended to reflect a weighting scheme that is not a mere randomized application of weights, but instead, reflect a determination that these ordered positions typically receive an approximate percentage of traffic resulting from the search. For instance, published data related to a particular search engine may indicate that the first position in the SERP for the particular search engine receives thirty percent of all traffic, the second position in the SERP for the particular search engine receives twenty-five percent of all traffic, the third position in the SERP for the particular search engine receives twenty percent of all traffic, and the remaining twenty-five percent of traffic is split in weighting the fourth-tenth positions in the SERP for the particular search engine. Therefore, the weighted values noted in each case above are defined accordingly. However, as the data supporting the application of the weights may change, so to can the weights applied to the ordered positions, or may be applied differently for different search engines, depending on the underlying expectation of traffic for the search engine being used.

In this specification, the term "software" is meant to include applications stored in magnetic storage, which can be read into memory for processing by a processor. In some embodiments, the software, when installed to operate on one or more electronic systems, define one or more specific machine implementations that execute and perform the operations of the software. In particular, the processes described above may be implemented as software processes that are specified as a set of instructions recorded on a computer readable storage medium (also referred to as a non-transitory computer readable medium). When these instructions are executed by one or more processing unit(s), they cause the processing unit(s) to perform the actions indicated in the instructions. Examples of computer readable media include, but are not limited to, CD-ROMs, flash drives, RAM chips, hard drives, EPROMs, EEPROMs, etc. The computer readable media does not include carrier waves and electronic signals passing wirelessly or over wired connections.

Figure 22:
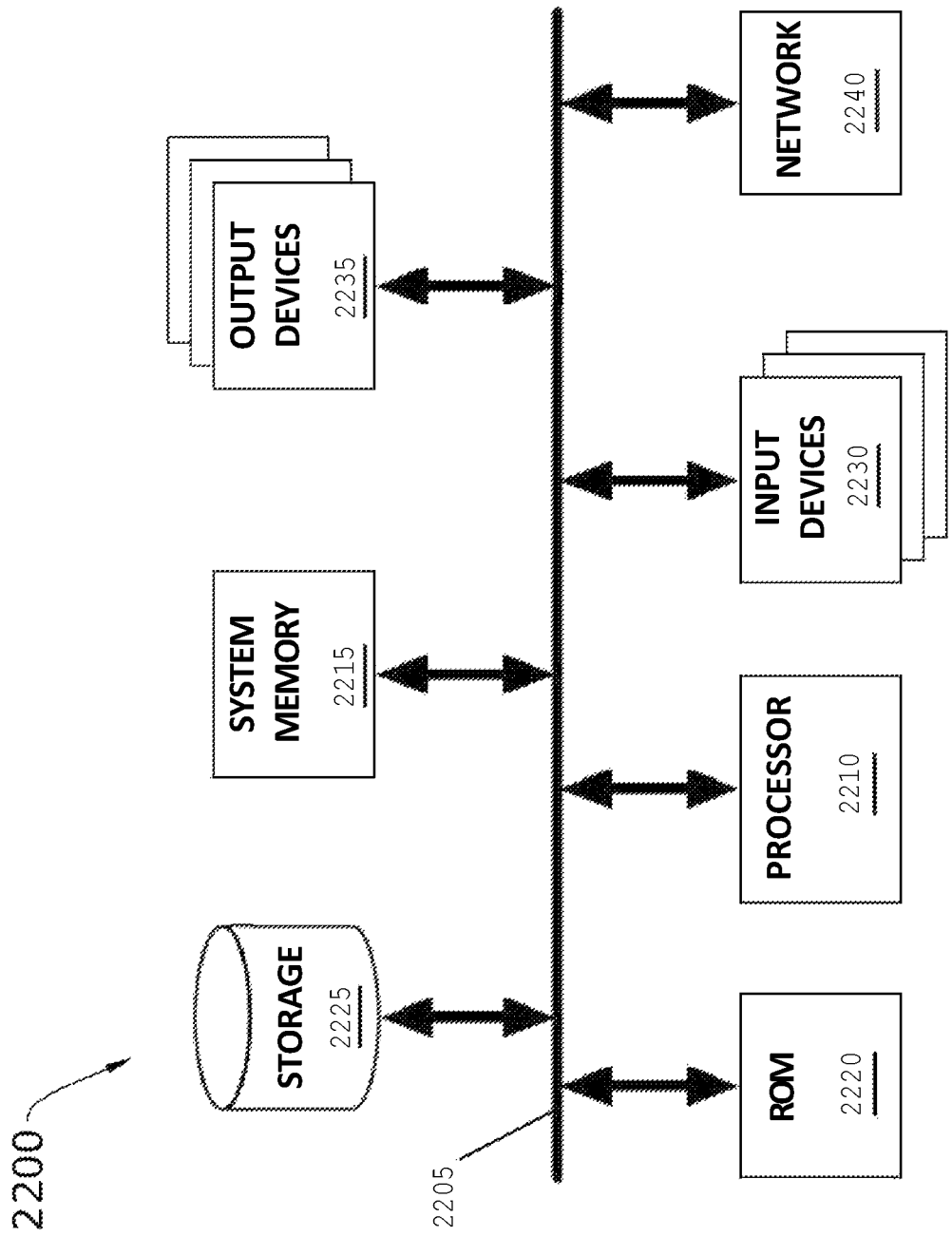
FIG. 22 conceptually illustrates an electronic system with which some embodiments of the invention are implemented.

FIG. 22 illustrates an electronic system 2200. The electronic system 2200 may be any computing device, such as a desktop or laptop computer, a tablet, a smart phone, or any other sort of electronic device. Such an electronic system 2200 includes various types of computer readable media and interfaces for various other types of computer readable media. The electronic system 2200 shown in this figure includes a bus 2205, processing unit(s) 2210, a system memory 2215, a read-only memory 2220, a permanent storage device 2225, input devices 2230, output devices 2235, and a network 2240.

The above-described embodiments of the invention are presented for purposes of illustration and not of limitation. Thus, the invention is not to be limited by the foregoing illustrative details, but rather is to be defined by the appended claims.

I claim:

1. A user intent score quantification process comprising:
compiling a keyword list comprising a plurality of keywords associated with web content to be ranked, wherein the plurality of keywords comprises a first keyword and a second keyword that is different from the first keyword;
entering, into a search engine, the first keyword;
receiving a first search engine results page ("SERP") based on the search engine retrieving a first set of links to a first set of web resources related to a first search engine interpretation of the first keyword;
performing an intent score matrix evaluation of web content associated with the first set of retrieved links to the first set of web resources;
determining a first intent score for the first keyword based the intent score matrix evaluation;
entering, into the search engine, the second keyword;
receiving a second SERP based on the search engine retrieving a second set of links to a second set of web resources related to a second search engine interpretation of the second keyword;
performing the intent score matrix evaluation of web content associated with the second set of retrieved links to the second set of web resources;
determining a second intent score for the second keyword based the intent score matrix evaluation; and
sorting the first keyword and the second keyword according to a proximity of the first intent score and the second intent score to an ideal matching intent score of one.

2. The user intent score quantification process of claim 1 further comprising:
creating a keyword research document with one or more metrics that are organized for tallying results of an evaluation of intent score for the plurality of keywords; and
adding an intent score area to the keyword research document.

3. The user intent score quantification process of claim 1, wherein performing the intent score matrix evaluation of web content associated with the first set of retrieved links to the first set of web resources and performing the intent score matrix evaluation of web content associated with the second set of retrieved links to the second set of web resources comprises performing a feature-by-feature intent score matrix evaluation.

4. The user intent score quantification process of claim 3, wherein performing the feature-by-feature intent score matrix evaluation comprises comparing the web content to be ranked with information presented on webpages as retrieved by each of a plurality of consistent features in the SERP which consistently appear in web page content.

5. The user intent score quantification process of claim 4, wherein performing the feature-by-feature intent score matrix evaluation further comprises comparing the web content to be ranked with the information presented on the webpages as retrieved by each of a plurality of possible features in the SERP which are possible to appear in web page content.

6. The user intent score quantification process of claim 1 further comprising:
ranking the plurality of keywords based on the proximity of each intent score to the ideal matching intent score of one.

7. A process for quantifying user intent for prioritizing which keywords to use to rank a web page for search engine queries, said process comprising:
selecting a web page to identify web content to be ranked by a search engine;
determining an intent of the web content to be ranked by the search engine;
compiling a list of keywords expected to match the intent of a web page to rank, wherein the list of keywords comprises a plurality of keywords;
using a keyword research tool to extract additional metrics from the web content to include with the list of keywords;
creating a keyword research document;
compiling the list of keywords and the extracted metrics in the keyword research document;
adding an intent score area to the keyword research document, wherein the intent score area spans the list of keywords compiled in the keyword research document, wherein the intent score area comprises a plurality of intent score cells, wherein each intent score cell is associated with a different keyword in the list of keywords, wherein an intent score is assigned to each intent score cell to indicate a proximity to an ideal matching intent score of one that matches the intent of the web content to be ranked by the search engine among the plurality of keywords compiled in the keyword research document;

entering a first keyword from the list of keywords into a search field of a search engine;

receiving a set of results in a search engine results page ("SERP") returned by the search engine after searching for web content based on the first keyword;

examining the set of results in the SERP by using an intent score matrix to tally a predefined intent score on a feature-by-feature basis as appearing in the set of results in the SERP;

identifying a plurality of features for which to tally the predefined intent score on the feature-by-feature basis, wherein the plurality of features comprise a consistently-appearing feature that consistently appears in search engine results pages, a possibly-appearing feature that is expected to appear in some search engine results pages without consistently appearing in all search engine results pages, and unique features that are created by search engines and appear in search engine results pages;

disregarding non-appearing features in the plurality of features which do not appear on the set of results in the SERP returned by the search engine after searching for web content based on the first keyword;

processing all appearing features in the plurality of features which appear in the set of results in the SERP returned by the search engine after searching for web content based on the first keyword;

applying, for each appearing feature, the intent score matrix to the appearing feature to derive a search term value corresponding to the appearing feature;

aggregating the derived search term values tallied for the corresponding appearing features;

adding, from the aggregation of derived search terms, each derived search term value to the corresponding appearing feature;

calculating an aggregated search term average of the derived search term values tallied for the corresponding appearing features;

using the calculated aggregated search term average as an average intent score for the first keyword;

assigning the average intent score for the first keyword to the intent score cell associated with the first keyword in the keyword research document;

processing each successive keyword in the list of keywords by performing the entering, receiving, examining, identifying, processing, applying, aggregating, adding, calculating, using, and assigning steps until there are no unprocessed successive keywords in the plurality of keywords;

sorting the list of keywords by the assigned average intent score for each keyword, wherein the list of keywords is sorted in the keyword research document by the proximity of the assigned average intent score of the keyword to the ideal matching intent score of one; and ranking each keyword in the list of keywords based on the assigned average intent score for the keyword and one or more of a search engine optimization strategy that is associated with the search engine, a campaign, and a particular web page.

8. The process for quantifying user intent for prioritizing which keywords to use to rank a web page for search engine queries of claim 7, wherein the additional metrics extracted from the web content include a plurality of metrics, wherein the plurality of metrics comprise each keyword, a search volume, and a search difficulty.

9. The process for quantifying user intent for prioritizing which keywords to use to rank a web page for search engine queries of claim 8 further comprising:

sorting the assigned average intent scores associated with the plurality of keywords;

prioritizing keyword usage for the keywords in the plurality of keywords based on the proximity of the assigned average intent score to the ideal matching intent score of one; and repeating the sorting of the assigned average intent scores and the prioritizing keyword usage steps for each subsequent keyword entered beyond the plurality of keywords.

* * * * *